United States Patent
Islam et al.

(10) Patent No.: US 10,448,380 B2
(45) Date of Patent: Oct. 15, 2019

(54) SPLIT SYMBOL CONTROL FOR ALIGNED NUMEROLOGY

(71) Applicant: QUALCOMM Incorporated, San Diego, CA (US)

(72) Inventors: Muhammad Nazmul Islam, Edison, NJ (US); Sundar Subramanian, Bridgewater, NJ (US); Tingfang Ji, San Diego, CA (US); Jing Jiang, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 15/420,204

(22) Filed: Jan. 31, 2017

(65) Prior Publication Data

US 2017/0374652 A1    Dec. 28, 2017

Related U.S. Application Data

(60) Provisional application No. 62/355,161, filed on Jun. 27, 2016.

(51) Int. Cl.
*H04W 72/04* (2009.01)
*H04L 5/14* (2006.01)
(Continued)

(52) U.S. Cl.
CPC ......... *H04W 72/042* (2013.01); *H04L 5/0053* (2013.01); *H04L 5/14* (2013.01); *H04W 76/27* (2018.02); *H04L 27/2655* (2013.01); *H04L 27/2662* (2013.01); *H04L 27/2675* (2013.01); *H04W 72/0413* (2013.01); *H04W 72/0446* (2013.01)

(58) Field of Classification Search
CPC ............... H04W 72/042; H04W 76/27; H04W 72/0446; H04W 72/0413; H04L 5/0053; H04L 5/14; H04L 27/2675; H04L 27/2662; H04L 27/2655
See application file for complete search history.

(56) References Cited

U.S. PATENT DOCUMENTS 8,179,857 B2 *   5/2012   Kwon ................... H04L 5/0007
                                                    370/330
8,625,403 B2 *   1/2014   Sun ........................ H04J 13/18
                                                    370/203
(Continued)

OTHER PUBLICATIONS

Ericsson, "M-PDCCH Search Space for MTC," 3GPP TSG RAN WG1 Meeting #82, R1-153730, Beijing, China, Aug. 24-28, 2015, 4 pgs., XP051001178, 3rd Generation Partnership Project.
(Continued)

*Primary Examiner* — Brian T O Connor
(74) *Attorney, Agent, or Firm* — Holland & Hart LLP

(57) ABSTRACT

Methods, systems, and devices for wireless communication provide for split symbol control by varying tone spacing and symbol duration for control channels in a subframe. The control symbols may be transmitted at various locations within the subframe and may be transmitted to different mobile devices. In some examples, multiple control symbols may be transmitted in a subframe to multiple mobile devices depending on the capabilities of each of the multiple mobile devices.

30 Claims, 15 Drawing Sheets

(51) Int. Cl.
    *H04L 5/00*     (2006.01)
    *H04W 76/27*     (2018.01)
    *H04L 27/26*     (2006.01)

(56) References Cited

U.S. PATENT DOCUMENTS

| | | | | |
|---|---|---|---|---|
| 8,811,300 | B2* | 8/2014 | Lin | H04L 5/0007 370/310 |
| 9,166,720 | B2* | 10/2015 | Sun | H04J 13/18 |
| 9,496,977 | B2* | 11/2016 | Sun | H04J 13/18 |
| 10,193,724 | B2* | 1/2019 | Parkvall | H04L 5/003 |
| 2010/0238873 | A1* | 9/2010 | Asanuma | H04L 5/0007 370/329 |
| 2011/0134747 | A1* | 6/2011 | Kwon | H04L 1/0028 370/208 |
| 2012/0039270 | A1* | 2/2012 | Nguyen | H04J 11/003 370/329 |
| 2012/0051209 | A1* | 3/2012 | Sun | H04J 13/18 370/208 |
| 2012/0170543 | A1* | 7/2012 | Asanuma | H04L 5/0007 370/329 |
| 2012/0176992 | A1* | 7/2012 | Asanuma | H04L 5/0007 370/329 |
| 2015/0280871 | A1* | 10/2015 | Xu | H04W 72/0446 370/330 |
| 2015/0289220 | A1* | 10/2015 | Kim | H04W 56/00 370/336 |
| 2016/0156492 | A1* | 6/2016 | Martinez | H04L 27/2655 375/340 |
| 2017/0013481 | A1* | 1/2017 | Wang | H04W 4/70 |
| 2017/0164350 | A1* | 6/2017 | Sun | H04L 5/0007 |
| 2017/0331577 | A1* | 11/2017 | Parkvall | H04J 11/0079 |
| 2017/0331670 | A1* | 11/2017 | Parkvall | H04W 52/0274 |
| 2017/0332359 | A1* | 11/2017 | Tsai | H04B 7/0617 |
| 2017/0366311 | A1* | 12/2017 | Iyer | H04B 7/0482 |
| 2018/0084486 | A1* | 3/2018 | Pradas | H04W 24/10 |
| 2019/0089563 | A1* | 3/2019 | Parkvall | H04L 5/003 |

OTHER PUBLICATIONS

Ericsson, "Nb-loT—DCI Content," 3GPP TSG-RAN1 Meeting #84-BIS, R1-162772, Busan, Korea, Apr. 11-15, 2016, 4 pgs., XP051088716, 3rd Generation Partnership Project.

ISA/EP, International Search Report and Written Opinion of the International Searching Authority, Int'l Application No. PCT/US2017/035592, dated Oct. 17, 2017, European Patent Office, Rijswijk, NL, 18 pgs.

Qualcomm Incorporated, "Design Principles of NB-loT SYNC Channel," 3GPP TSG RAN WG1 Meeting #83, R1-157068, Anaheim, USA, Nov. 15-22, 2015, 6 pgs., XP051003362, 3rd Generation Partnership Project.

Qualcomm Incorporated, "DL Channel Design for Shortened TTI," 3GPP TSG RAN WG1 Meeting #85, R1-164458, Nanjing, China, May 23-27, 2016, 7 pgs., XP051096436, 3rd Generation Partnership Project.

ISA/EPO, Partial International Search Report of the International Searching Authority, Int'l App. No. PCT/US2017/035592, dated Aug. 18, 2017, European Patent Office, Rijswijk, NL, 12 pgs.

* cited by examiner

SPLIT SYMBOL CONTROL FOR ALIGNED NUMEROLOGY

CROSS REFERENCES

The present application for patent claims priority to U.S. Provisional Patent Application No. 62/355,161 by Islam, et al., entitled "Split Symbol Control For Aligned Numerology," filed Jun. 27, 2016, assigned to the assignee hereof.

BACKGROUND

The following relates generally to wireless communication, and more specifically to split symbol control for aligned numerology.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A wireless communications system may use different spectrum bands for supporting communication between a base station and a UE. For example, the spectrum bands may be in a range between 700 and 3500 megahertz (MHz) (e.g., in an LTE system) to between 30 and 300 gigahertz (GHz) (e.g., in a millimeter wave (mmW) system), among others. When communicating with a UE, a base station may modulate data based on a modulation and coding scheme (MCS). The modulated data may then be mapped to sub-carriers in the frequency domain known as tones and to resources in the time domain known as symbols. Each tone may be associated with a frequency and the interval between tones may be referred to as tone spacing. Each symbol may have a corresponding symbol duration, which may vary depending on the tone spacing. While UEs and base stations in a multiple-access communications system may support different spectrum bands, using the same or similar tone spacing for communication in different spectrum bands may result in inter-symbol interference, a lack of signal reception, or may have other unfavorable effects on packet transmission or reception.

SUMMARY

The described techniques relate to improved methods, systems, devices, or apparatuses that support split symbol control for aligned numerology. For example, the described techniques provide for varying tone spacing within a subframe having multiple transmission time intervals (TTIs). In some examples, a subframe may also be referred to as a slot, mini slot, TTI, or any other duration. For example, a slot may be used as a unit of scheduling. Additionally or alternatively, the slot may contain a downlink (DL) control and an uplink (UL) control. The tone spacing may vary depending on the spectrum band used to transmit the signal or the signal type. In some cases, the tone spacing may vary throughout a subframe for a given signal type. For example, a control symbol may have a tone spacing and symbol duration in a first multi-TTI of a subframe, but a different tone spacing and symbol duration in a second multi-TTI of the subframe. In some examples, multiple control symbols may be transmitted to different mobile devices consecutively at the beginning of a subframe. Additionally or alternatively, multiple uplink symbols may be received (e.g., from different mobile devices) consecutively at the end of the subframe. The transmission order for the control symbols may depend on capabilities of the different UEs to which the control symbols are transmitted and in some cases, multiple control symbols may be transmitted at different locations (e.g., in different multi-TTIs) within a subframe.

A method of wireless communication is described. The method may include identifying a first number of control symbols for a subframe based at least in part on a first tone spacing, determining locations within the subframe for each of the first number of control symbols, and transmitting the first number of control symbols in the subframe in accordance with the determined locations.

An apparatus for wireless communication is described. The apparatus may include means for identifying a first number of control symbols for a subframe based at least in part on a first tone spacing, means for determining locations within the subframe for each of the first number of control symbols, and means for transmitting the first number of control symbols in the subframe in accordance with the determined locations.

Another apparatus for wireless communication is described. The apparatus may include a processor, memory in electronic communication with the processor, and instructions stored in the memory. The instructions may be operable to cause the processor to identify a first number of control symbols for a subframe based at least in part on a first tone spacing, determine locations within the subframe for each of the first number of control symbols, and transmit the first number of control symbols in the subframe in accordance with the determined locations.

A non-transitory computer-readable medium for wireless communication is described. The non-transitory computer-readable medium may include instructions operable to cause a processor to identify a first number of control symbols for a subframe based at least in part on a first tone spacing, determine locations within the subframe for each of the first number of control symbols, and transmit the first number of control symbols in the subframe in accordance with the determined locations.

In some examples of the method, apparatus, and non-transitory computer-readable medium described above, the determined locations for each of the first number of control symbols being based at least in part on capabilities of mobile devices to which the first number of control symbols are to be transmitted.

In some examples of the method, apparatus, and non-transitory computer-readable medium described above, transmitting the first number of control symbols comprises: transmitting the first number of control symbols to multiple mobile devices based at least in part on capabilities of the multiple mobile devices.

In some examples of the method, apparatus, and non-transitory computer-readable medium described above, each control symbol of the first number of control symbols corresponds to a different mobile device.

In some examples of the method, apparatus, and non-transitory computer-readable medium described above, the first number of control symbols may be multiplexed according to a time division duplex (TDD) multiplexing scheme.

In some examples of the method, apparatus, and non-transitory computer-readable medium described above, transmitting the first number of control symbols in the subframe comprises: transmitting the first number of control symbols to respective mobile devices prior to traffic symbols intended for the respective mobile devices.

In some examples of the method, apparatus, and non-transitory computer-readable medium described above, determining locations within the subframe for each of the first number of control symbols comprises: locating a first control symbol corresponding to a first mobile device next to and in advance of additional control symbols corresponding to additional mobile devices, a duration of the first control symbol and the additional control symbols being approximately equal to a duration of a single control symbol for the first mobile device utilizing a second tone spacing.

In some examples of the method, apparatus, and non-transitory computer-readable medium described above, transmitting the first number of control symbols in the subframe comprises: transmitting all of the first number of control symbols in consecutive symbols at a beginning of the subframe.

Some examples of the method, apparatus, and non-transitory computer-readable medium described above may additionally or alternatively include processes, features, means, or instructions for receiving a radio resource control (RRC) message from at least one respective mobile device. Some examples of the method, apparatus, and non-transitory computer-readable medium described above may additionally or alternatively include processes, features, means, or instructions for determining capabilities of the at least one respective mobile device based at least in part on the received RRC message.

Some examples of the method, apparatus, and non-transitory computer-readable medium described above may additionally or alternatively include processes, features, means, or instructions for determining a symbol index for initiating data transmission of at least one respective mobile device based at least in part on the identified first number of control symbols.

Some examples of the method, apparatus, and non-transitory computer-readable medium described above may additionally or alternatively include processes, features, means, or instructions for transmitting the determined symbol index to the at least one respective mobile device using an RRC channel.

In some examples of the method, apparatus, and non-transitory computer-readable medium described above, the capabilities of the mobile devices comprises at least one of processing time to decode a symbol associated with a physical downlink control channel (PDCCH) or energy consumed to search for control information at different symbols of the subframe.

A method of wireless communication is described. The method may include transmitting, in accordance to a first tone spacing, a first control symbol at a first control start time within a first subframe, and a first data symbol at a first data start time within the first subframe and transmitting, in accordance to a second tone spacing, a second control symbol at a second control start time within a second subframe, and a second data symbol at a second data start time within the second subframe, the second control start time being the same as the first control start time and the second data start time being different from the first data start time.

An apparatus for wireless communication is described. The apparatus may include means for transmitting, in accordance to a first tone spacing, a first control symbol at a first control start time within a first subframe, and a first data symbol at a first data start time within the first subframe and means for transmitting, in accordance to a second tone spacing, a second control symbol at a second control start time within a second subframe, and a second data symbol at a second data start time within the second subframe, the second control start time being the same as the first control start time and the second data start time being different from the first data start time.

Another apparatus for wireless communication is described. The apparatus may include a processor, memory in electronic communication with the processor, and instructions stored in the memory. The instructions may be operable to cause the processor to transmit, in accordance to a first tone spacing, a first control symbol at a first control start time within a first subframe, and a first data symbol at a first data start time within the first subframe and transmit, in accordance to a second tone spacing, a second control symbol at a second control start time within a second subframe, and a second data symbol at a second data start time within the second subframe, the second control start time being the same as the first control start time and the second data start time being different from the first data start time.

A non-transitory computer-readable medium for wireless communication is described. The non-transitory computer-readable medium may include instructions operable to cause a processor to transmit, in accordance to a first tone spacing, a first control symbol at a first control start time within a first subframe, and a first data symbol at a first data start time within the first subframe and transmit, in accordance to a second tone spacing, a second control symbol at a second control start time within a second subframe, and a second data symbol at a second data start time within the second subframe, the second control start time being the same as the first control start time and the second data start time being different from the first data start time.

In some examples of the method, apparatus, and non-transitory computer-readable medium described above, the first tone spacing may be associated with a first carrier frequency and the second tone spacing may be associated with a second carrier frequency different from the first carrier frequency.

Some examples of the method, apparatus, and non-transitory computer-readable medium described above may additionally or alternatively include processes, features, means, or instructions for transmitting in accordance with the first tone spacing or transmitting in accordance with the second tone spacing may be based at least in part on different environments or delay spread.

In some examples of the method, apparatus, and non-transitory computer-readable medium described above, a transmission duration associated with the first control symbol may be the same as a transmission duration associated with the second control symbol.

In some examples of the method, apparatus, and non-transitory computer-readable medium described above, a transmission duration associated with the first control symbol may be different from a transmission duration associated with the second control symbol.

A method of wireless communication is described. The method may include receiving, in accordance to a first tone spacing, a first control symbol at a first control start time within a first subframe, and a first data symbol at a first data start time within the first subframe and receiving, in accordance to a second tone spacing, a second control symbol at a second control start time within a second subframe, and a second data symbol at a second data start time within the second subframe, the second control start time being the same as the first control start time and the second data start time being different from the first data start time.

An apparatus for wireless communication is described. The apparatus may include means for receiving, in accordance to a first tone spacing, a first control symbol at a first control start time within a first subframe, and a first data symbol at a first data start time within the first subframe and means for receiving, in accordance to a second tone spacing, a second control symbol at a second control start time within a second subframe, and a second data symbol at a second data start time within the second subframe, the second control start time being the same as the first control start time and the second data start time being different from the first data start time.

Another apparatus for wireless communication is described. The apparatus may include a processor, memory in electronic communication with the processor, and instructions stored in the memory. The instructions may be operable to cause the processor to receive, in accordance to a first tone spacing, a first control symbol at a first control start time within a first subframe, and a first data symbol at a first data start time within the first subframe and receive, in accordance to a second tone spacing, a second control symbol at a second control start time within a second subframe, and a second data symbol at a second data start time within the second subframe, the second control start time being the same as the first control start time and the second data start time being different from the first data start time.

A non-transitory computer-readable medium for wireless communication is described. The non-transitory computer-readable medium may include instructions operable to cause a processor to receive, in accordance to a first tone spacing, a first control symbol at a first control start time within a first subframe, and a first data symbol at a first data start time within the first subframe and receive, in accordance to a second tone spacing, a second control symbol at a second control start time within a second subframe, and a second data symbol at a second data start time within the second subframe, the second control start time being the same as the first control start time and the second data start time being different from the first data start time.

In some examples of the method, apparatus, and non-transitory computer-readable medium described above, the first tone spacing may be associated with a first carrier frequency and the second tone spacing may be associated with a second carrier frequency different from the first carrier frequency.

Some examples of the method, apparatus, and non-transitory computer-readable medium described above may additionally or alternatively include processes, features, means, or instructions for receiving in accordance with the first tone spacing or receiving in accordance with the second tone spacing may be based at least in part on different environments or delay spread.

In some examples of the method, apparatus, and non-transitory computer-readable medium described above, a reception duration associated with the first control symbol may be the same as a reception duration associated with the second control symbol.

In some examples of the method, apparatus, and non-transitory computer-readable medium described above, a reception duration associated with the first control symbol may be different from a reception duration associated with the second control symbol.

DETAILED DESCRIPTION

Figure 1:
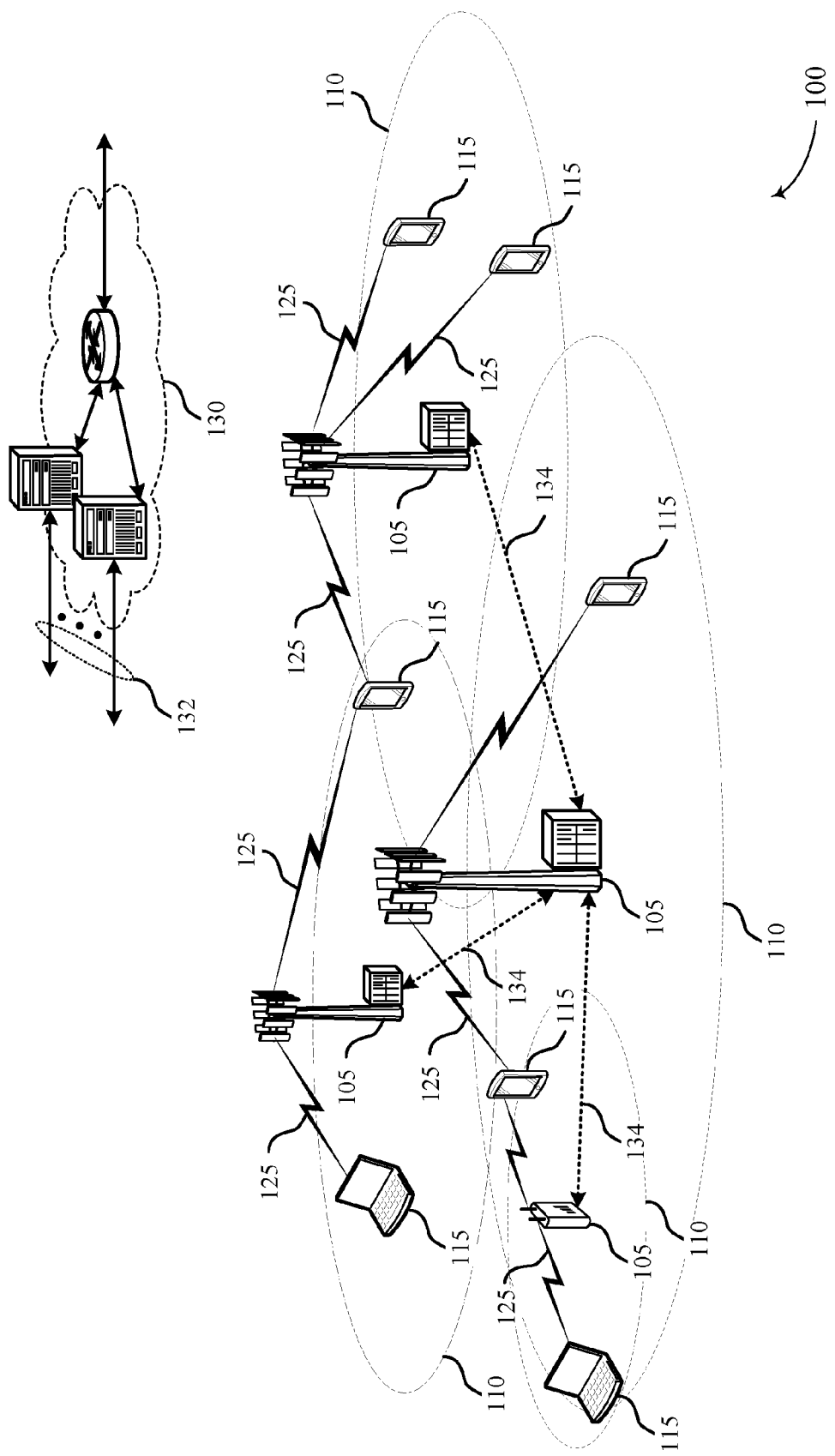
FIG. 1 illustrates an example of a system for wireless communication that supports split symbol control for aligned numerology in accordance with aspects of the present disclosure.

Some wireless communications systems (e.g., a Long Term Evolution (LTE)/LTE-Advanced (LTE-A) system or a millimeter wave (mmW) system) may employ a fixed tone spacing for all spectrum bands supported by the system. For instance, in an LTE/LTE-A system, the tone spacing may be a reciprocal of the symbol duration and may be selected in order to avoid or mitigate blurring caused by the Doppler shift and to maintain orthogonality between tones.

As the center frequency of different spectrum bands increases, having a larger tone spacing may help mitigate phase noise experienced when communicating at higher frequencies. Accordingly, in some examples, a wireless communications system may support spectrum bands having different tone spacings. While tone spacing may be predetermined for a subframe (e.g., depending on the spectrum band or type of signal to be transmitted), tone spacing may additionally or alternatively vary throughout a subframe. In some examples, a subframe may span a duration in time and may be referred to as a slot, a mini slot, a time period, a TTI, or any other term used to describe a time interval. The subframe (or slot, mini slot, TTI, etc.) may be a unit of scheduling. In some examples, the subframe (also referred to as slot, mini slot, TTI, etc.) may be used to define timing boundaries. In some examples, the subframe (or slot, mini slot, TTI, etc.) may include 7, 14 or 28 symbols. In some examples, the subframe may include one or more slots, each of which may include multiple symbols that may be the smallest unit of scheduling. In other cases, the subframe or any other time duration may be the smallest unit of scheduling. In some cases, the subframe (or slot, mini slot, TTI, etc.) may include a downlink control region and/or an uplink control region. For instance, multiple transmission time intervals (TTIs) may span a subframe and control symbols (e.g., downlink control symbols or uplink control symbols) corresponding to the multiple TTIs may be divided into smaller symbol durations and transmitted at different locations within the subframe and/or according to different tone spacings.

Additionally or alternatively, the subframe (or slot, mini slot, TTI, etc.) may contain a DL control and a UL control. In some examples, the subframe (or slot, mini slot, TTI, etc.) may include downlink centric slots, that may include DL control as well as DL data. In some examples, the downlink centric slot may include DL control at the beginning of the slot and DL data at the end of the slot. In some examples, the subframe (or slot, mini slot, TTI, etc.) may include uplink centric slots, that may include UL control as well as UL data. In some examples, the uplink centric slot may include UL data at the beginning of the slot and UL control at the end of the slot. In some other examples, the subframe (or slot, mini slot, TTI, etc.) may include downlink centric slots and uplink centric slots.

In some examples, the order in which the control symbols are transmitted to multiple UEs may depend on the capabilities of each of the UEs. For example, a first UE may take longer to process control information compared to a second UE. In such instances, control information for the first UE may be transmitted prior to control information for the second UE. In addition, or in the alternative, power consumption for the multiple UEs may be considered when determining the order in which the transmit control symbols. For example, if a UE is a low-power device, control information for that UE may be transmitted prior to control information for other UEs.

In some examples, control symbols for one tone spacing may be aligned in time with one or more control symbols associated with a second tone spacing. For example, two control symbols associated with a first tone spacing may span the same duration as one control symbol associated with a second tone spacing. Additionally or alternatively, the control symbols for a given tone spacing may be scaled to include a cyclic prefix (CP) with a fraction of the CP in control symbols associated with different tone spacing.

Aspects of the disclosure are initially described in the context of a wireless communications system. Aspects of the disclosure are further illustrated by and described with reference to apparatus diagrams, system diagrams, and flowcharts that relate to split symbol control for aligned numerology.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may support LTE/LTE-A or mmW. The wireless communications system 100 may support split symbol control for aligned numerology by varying tone spacing and symbol duration for control channels. The control symbols may be transmitted at various locations within a subframe (or slot, mini slot, TTI, etc.). In some examples, the wireless communications system 100 may transmit multiple control symbols based on UE capabilities.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may additionally or alternatively be referred to as a mobile station, a subscriber station, a remote unit, a wireless device, an access terminal (AT), a handset, a user agent, a client, or like terminology. A UE 115 may additionally or alternatively be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) 105.

A physical downlink control channel (PDCCH) carries downlink control information (DCI) in at least one control channel element (CCE), which may comprise of nine logically contiguous resource element groups (REGs), where each REG contains 4 resource elements. DCI includes information regarding downlink (DL) scheduling assignments, UL resource grants, transmission schemes, uplink (UL) power control, hybrid automatic repeat request (HARD) information, modulation coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multi-input multi-output (MIMO), the DCI may include additional signaling information. DCI size and format depend on the amount of information as well as factors such as bandwidth, the number of antenna ports, and duplexing mode.

PDCCH may carry DCI messages associated with multiple users, and each UE 115 may decode the DCI messages that are intended for it. For example, each UE 115 may be assigned a cell radio network temporary identifier (C-RNTI) and cyclic redundancy check (CRC) bits attached to each DCI may be scrambled based on the C-RNTI. To reduce power consumption and overhead at the user equipment, a limited set of CCE locations may be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt to descramble all potential DCI messages using its C-RNTI, and perform a CRC check to determine whether the attempt was successful.

Carriers may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a GP. UL-DL configurations with switch-point periodicity equal to the frame period (e.g., 10 ms) or half of the frame period (e.g., 5 ms) may additionally or alternatively be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115.

In some wireless communications systems, such as a mmW communications system, channel bandwidths for communication may be relatively large and in such a system, in order to mitigate interference, the spacing between different carrier frequencies may additionally or alternatively be relatively large. As such, while a large bandwidth may be used in a mmW communications system, a limited number of carriers may be available for use. When such a system is being used for communication with multiple devices, frequency division multiplexing (FDM) may not be feasible or may be inefficient due to the limited number of carriers. Thus, time division multiplexing (TDM) may be employed to more efficiently utilize the resources available in a mmW system when multiple devices are present.

While TDM may be favorable in a mmW communications system, managing short TDM subframes may be inefficient due to the overhead needed for fixed turnaround times associated with short transmission time intervals (TTIs). To address this inefficiency, a subframe may be divided into multiple TTIs, having fixed or varied durations and extending for the duration of the subframe. Each multi-TTI may include multiple symbol periods and may be used for communication of uplink or downlink packets such as data packets, downlink control information, or uplink control information.

Figure 2:
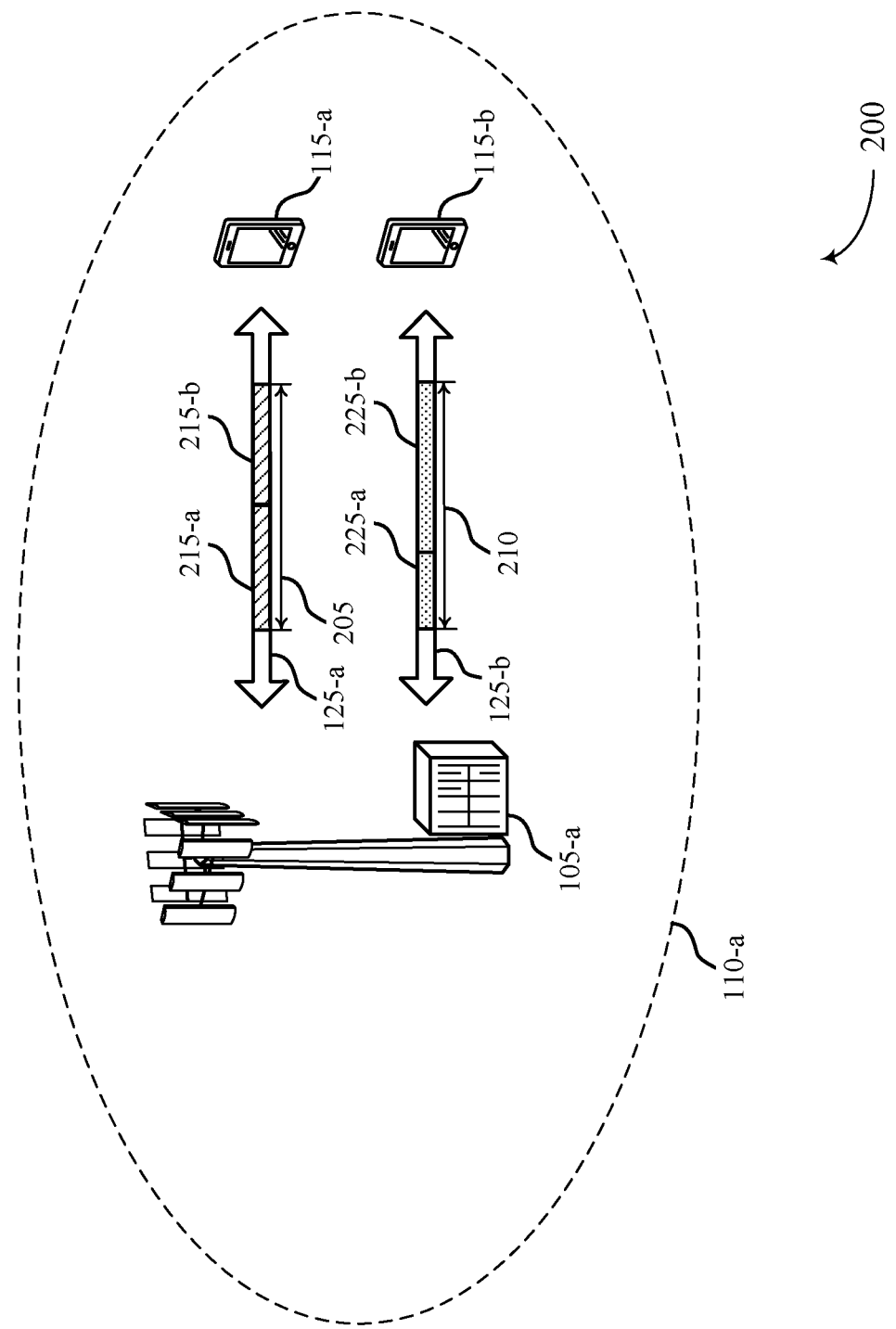
FIG. 2 illustrates an example of a system for wireless communication that supports split symbol control for aligned numerology in accordance with aspects of the present disclosure.

FIG. 2 illustrates an example of a wireless communications system 200 for split symbol control for aligned numerology in accordance with aspects of the present disclosure. In some cases, wireless communications system 200 may represent aspects of techniques performed by a UE 115 or base station 105 as described with reference to FIG. 1. The wireless communications system 200 may include a base station 105-*a* that supports communication with multiple UEs 115-*a* and 115-*b* over a coverage area 110-*a*.

As shown, base station 105-*a* supports bi-directional communication with UE 115-*a* and/or UE 115-*b* over communication link 125-*a*. Communication link 125-*a* may be associated with a first spectrum band. In downlink communication, for example, base station 105-*a* may transmit a signal to UE 115-*a* or UE 115-*b* over subframe 205. In some examples, subframe 205 may span a duration in time and may be referred to as a slot, a mini slot, a time period, a TTI, or any other term used to describe a time interval. The subframe 205 may be a unit of scheduling. In some examples, the subframe 205 may include one or more slots, each of which may include multiple symbols that may be the smallest unit of scheduling. In other cases, the subframe 205 or any other time duration may be the smallest unit of scheduling. In some cases, the subframe 205 (or slot, mini slot, TTI, etc.) may include a downlink control region and/or an uplink control region. In some examples, subframe 205 may include multiple TTIs and as shown in this example, subframe 205 includes two multi-TTIs 215-*a* and 215-*b*. Each of the multi-TTIs 215-*a* and 215-*b* may be allocated for communication with a corresponding mobile device, such as UEs 115-*a* and 115-*b*. For example, multi-TTI 215-*a* in subframe 205 may be allocated for communication with UE 115-*a*, and multi-TTI 215-*b* in subframe 205 may be allocated for communication with UE 115-*b*. In this example, each of the multi-TTIs 215-*a* and 215-*b* in subframe 205 span the same duration.

Base station 105-*a* additionally or alternatively supports communication with UE 115-*a* and/or UE 115-*b* over communication link 125-*b*. Communication link 125-*b* may be associated with a second spectrum band different from the first spectrum band associated with communication link 125-*a*. In downlink communication, for example, base station 105-*a* may transmit a signal to UE 115-*a* or UE 115-*b* over subframe 210. In some examples, subframe 210 may include multiple TTIs and as shown in this example, subframe 210 includes two multi-TTIs 225-*a* and 225-*b*. Each of the multi-TTIs 225-*a* and 225-*b* may be allocated for communication with a corresponding mobile device, such as UEs 115-*a* and 115-*b*. For example, multi-TTI 225-*a* in subframe 210 may be allocated for communication with UE 115-*b*, and multi-TTI 225-*b* in subframe 210 may be allocated for communication with UE 115-*a*. In this example, the multi-TTIs 225-*a* and 225-*b* vary in duration, with multi-TTI 225-*a* being shorter than multi-TTI 225-*b*.

In some examples, a UE 115 may operate in a dual-connection mode. In such instances, a UE 115 may be capable of communicating with a base station 105 according to two or more different tone spacings, which may be associated with different spectrum bands. For example, UE 115-*a* may be capable of operating in dual-connection mode and may have a line of sight (LOS) path with the base station 105-*a*. In this case, the UE 115-*a* may communicate with the base station 105-*a* using a tone spacing associated with a mmW spectrum band, which may result in a higher data rate or throughput as a result of larger tone spacing. At a later time, the UE 115-*a* may lose the LOS path with base station 105-*a* and may then begin communicating with the base station 105-*a* using a different tone spacing (e.g., a smaller tone spacing such as a tone spacing associated with an LTE spectrum band). In other cases, a UE 115-*a* may choose to communicate with base station 105-*a* in accordance with a third tone spacing different from tone spacings associated with the LTE or mmW spectrum bands.

Figure 3A:
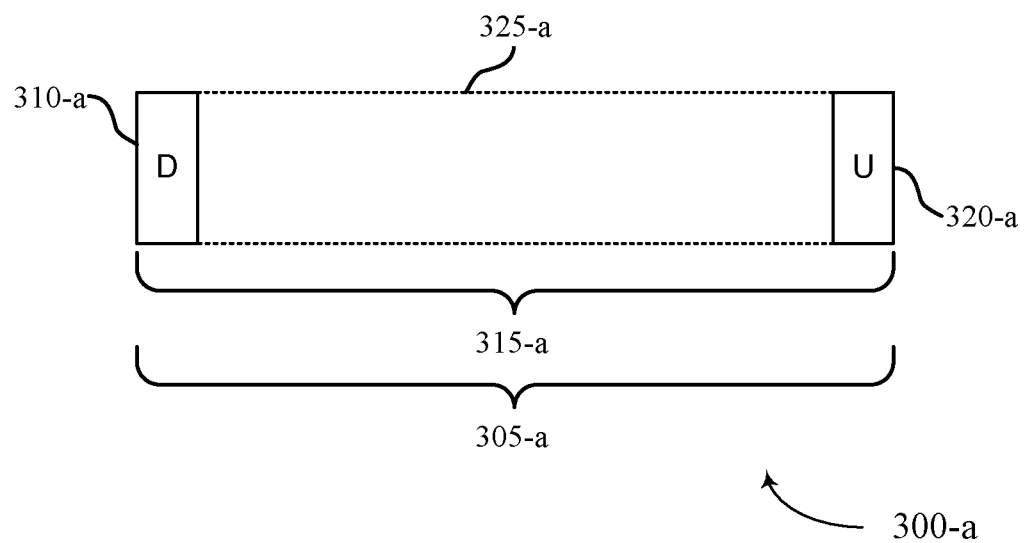
FIGS. 3A and 3B illustrate examples of a subframe that supports split symbol control for aligned numerology in accordance with aspects of the present disclosure.
Figure 3B:
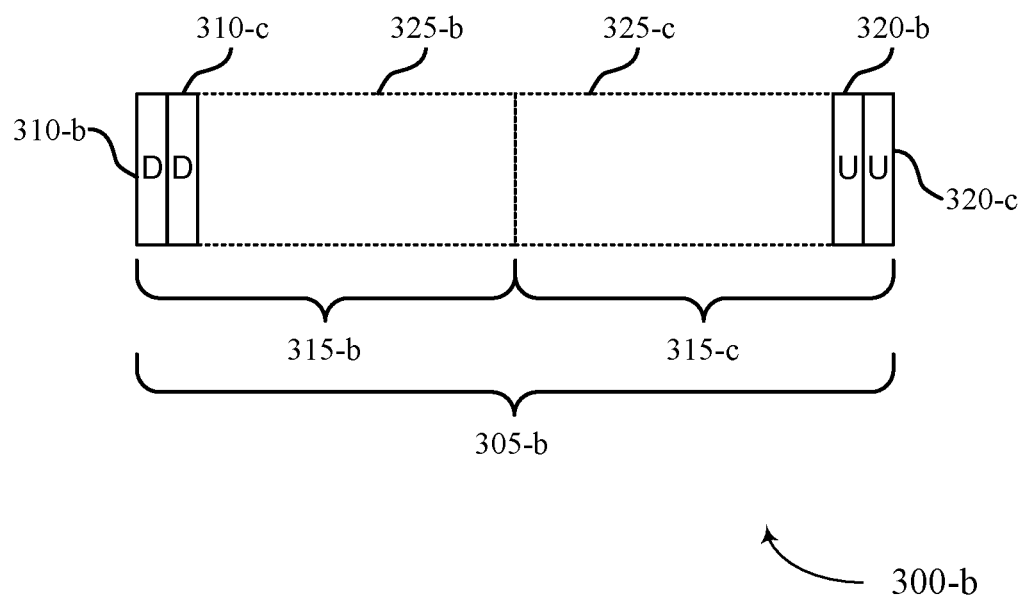

FIGS. 3A and 3B illustrate example subframes 300 for split symbol control for aligned numerology in accordance with aspects of the present disclosure. In FIG. 3A, subframe 300-*a* is shown having a duration 305-*a*. Subframe 300-*a* may be associated with a first tone spacing having a corresponding duration for symbols within the subframe. In some examples, the subframe may also be referred to as a slot, a mini slot, a TTI, etc. In this example, subframe 300-*a* is also shown having a TTI 315-*a* over which communication for one or more UEs may be performed.

As shown, subframe 300-*a* (or slot, mini slot, TTI, etc.) includes at least one DL burst 310-*a*, followed by a communication region 325-*a*, and ends with at least one UL burst 320-*a*. The DL burst 310-*a* may be transmitted using a control channel (e.g., a PDCCH) and may span a single DL control symbol. The DL burst 310-*a* may include information for one UE or may include information for multiple UEs. The communication region 325-*a* may be allocated for UL or DL communication (e.g., the exchange of data packets) between a base station and one or more UEs. The communication region 325-*a* may sometimes include a GP (not shown) when switching between UL and DL communication. The UL burst 320-*a* may be transmitted using a control channel (e.g., a physical uplink control channel (PUCCH)) and may span a single UL control symbol. The UL burst 320-*a* may include information (e.g., acknowledgement (ACK) or negative ACK (NACK), channel quality information (CQI)) from one UE or may include information from multiple UEs.

In some cases, using a single tone spacing for all communication scenarios and bands may not be the most efficient. Therefore, splitting control symbols may provide better flexibility in scheduling multiple users over the same duration. Accordingly, in some examples, DL burst 310-*a* or UL burst 320-*a* may be split into multiple control symbols having smaller symbol durations and each of the multiple control symbols may correspond with a respective UE.

In FIG. 3B, subframe 300-*b* having multiple TTIs is shown. Subframe 300-*b* spans duration 305-*b*, which may be the same as the duration 305-*a* in FIG. 3A. Similarly, subframe 330-*b* may be referred to as a slot, a mini slot, a TTI, etc. Subframe 300-*b* may be associated with a second tone spacing different from the first tone spacing in FIG. 3A. The second tone spacing may have a corresponding symbol duration, which may be smaller than the symbol duration of FIG. 3A (e.g., due to larger tone spacing).

In this example, a first multi-TTI 315-*b* and a second multi-TTI 315-*c* span the subframe duration 305-*b* (or slot duration). The first multi-TTI 315-*b* may be preceded by one or more downlink control symbols 310-*b* and 310-*c*. Each downlink control symbol may correspond to a respective UE. For examples, downlink control symbol 310-*b* may include information to be transmitted to a first UE, while downlink control symbol 310-*c* may include information to be transmitted to a second UE. In this example, the duration spanned by both downlink control symbols 310-*b* and 310-*c* (associated with a second tone spacing) may be the same as the duration spanned by DL burst 310-*a* of FIG. 3A (associated with a first tone spacing). In such cases, control information may be aligned between different tone spacings.

In addition, both downlink control symbols 310-*b* and 310-*c* may be transmitted in the first multi-TTI 315-*b* to two different UEs. For example, downlink control symbol 310-*b* may include information indicating that communication region 325-*b* is to be allocated for communication between a base station and a first UE, while control symbol 310-*c* may include information indicating that communication region 325-*c* is to be allocated for communication between a base station and a second UE.

In some examples, the order in which the control symbols are transmitted may depend on the capability of each of the first UE and the second UE. For instance, if the second UE takes longer than the first UE to process downlink control information, the control information for the second UE may be transmitted prior to the control information for the first UE. Additionally or alternatively, the second UE may be allocated communication region 325-*c* as communication region 325-*c* follows communication region 325-*b* giving the second UE more time to process the downlink control information. In other examples, power consumption of each UE may be considered when determining the order in which the transmit downlink control symbols 310-*b* and 310-*c*. For example, if a device such as an MTC device is operating with limited power (e.g., on a battery), it may use more power to search for control symbols if the control symbol corresponding to the device was transmitted at a later time. In such instances, the control symbol for the device may be transmitted near the beginning of subframe duration 305-*b*.

Nearing the end of subframe duration 305-*b*, UL control symbols 320-*b* and 320-*c* may be transmitted from different UEs to a base station. For example, UL control symbol 320-*b* may be transmitted from the first UE (allocated to communication region 325-*b*) and UL control symbol 320-*c* may be transmitted from the second UE (allocated to communication region 325-*c*). In some cases, the UL control symbols 320-*b* and 320-*c* may span the same duration as UL burst 320-*a* of FIG. 3A. For example, the UL burst 320-*a* may be divided into multiple UL control symbols 320-*b* and 320-*c* which correspond to different UEs. In such cases, the number of control symbols into which UL burst 320-*a* is divided may be included in one or both of the downlink control symbols 310-*b* and 310-*c*.

In some examples, the CP allocation for control information may be less than the CP allocation for data, and thus, downlink control symbols 310-*b* and 310-*c* or uplink control symbols 320-*b* and 320-*c* may be scaled to include a CP with half or a fraction of the CP in control symbols associated with the first tone spacing (of FIG. 3A). For example, DL burst 320-*a* of FIG. 3A may be divided into two downlink control symbols 320-*b* and 320-*c*, each of which may have a CP that is a fraction of the CP associated with the DL burst 320-*a*.

Figure 4A:
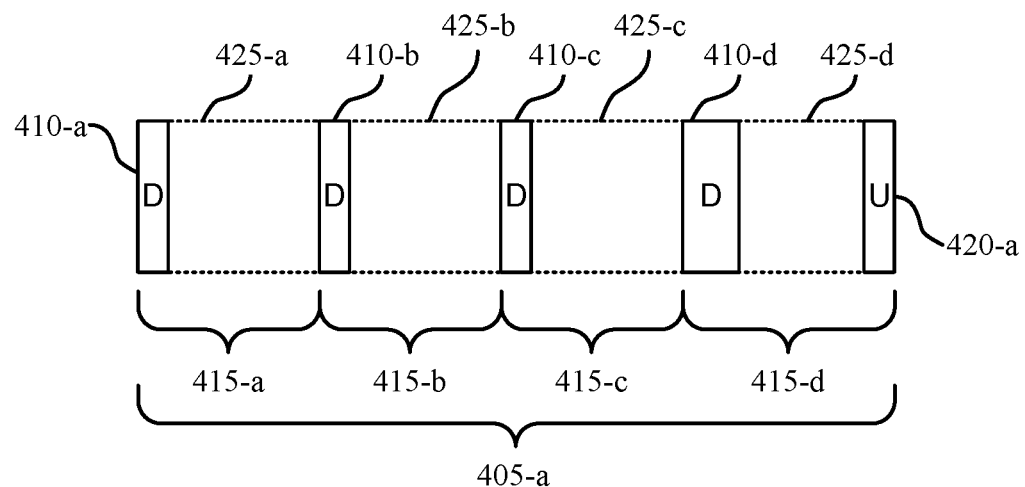
FIGS. 4A and 4B illustrate examples of a subframe that supports split symbol control for aligned numerology in accordance with aspects of the present disclosure.
Figure 4B:
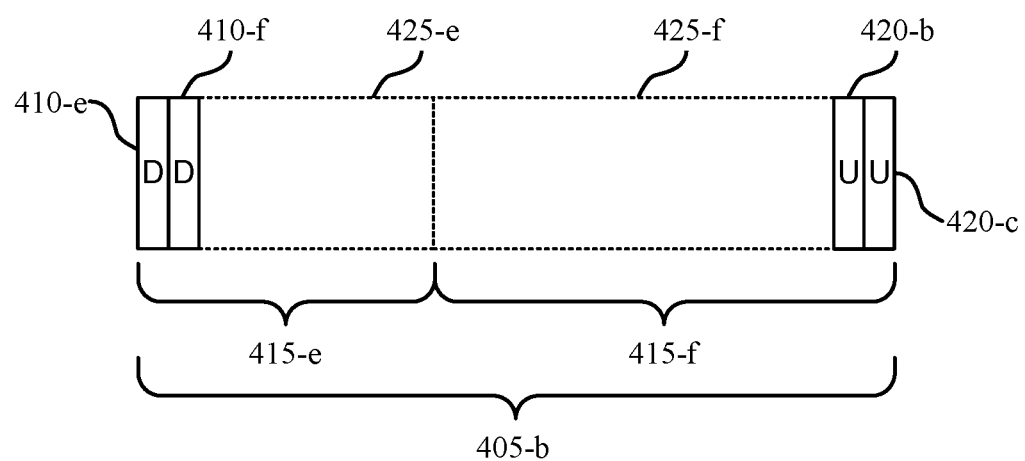

FIGS. 4A and 4B illustrate examples of subframes 400 for split symbol control for aligned numerology in accordance with aspects of the present disclosure. In FIG. 4A, subframe 400-*a* is shown having a duration 405-*a*. Subframe 400-*a* may be associated with a first tone spacing having a corresponding duration for symbols within the subframe 400-*a*. In this example, subframe 400-*a* is also shown having multiple TTIs 415 over which communication for one or more UEs may be performed. In some examples, the subframe 400-*a* may be referred to as a slot, a mini slot, a TTI, etc.

In this example, subframe 400-*a* includes multiple downlink control symbols 410 and multiple communication regions 425, each of which may be allocated for respective UEs. For example, downlink control symbol 410-*a* may include information for a first UE, which may be allocated to communication region 425-*a*. Similarly, downlink control symbols 410-*b*, 410-*c*, and 410-*d* may include information for different UEs and the different UEs may each be allocated to one of communication regions 425-*b*, 425-*c*, and 425-*d*. In some examples, the location of the downlink control symbols 410 may depend on UE capabilities and as shown, communication may begin for each of the different UEs following their respective downlink control symbol 410.

Following the communication regions 425, an uplink control symbol 420-*a* may be transmitted from one or more UEs and may include uplink control information such as CQI or a scheduling request.

In some examples, the duration of DL control symbols 410 may vary throughout subframe 400-*a*. For example, DL control symbol 410-*d* spans a longer duration than any of DL control symbols 410-*a*, 410-*b*, or 410-*c*. In such instances, DL control symbol 410-*d* may including information for multiple UEs which may all be allocated for communication in communication region 425-*d*. In other examples, DL control symbol 410-*d* may be transmitted according to a tone spacing different than the tone spacing associated with DL control symbols 410-*a*, 410-*b*, or 410-*c*. Thus, the tone spacing and control symbol duration may vary across subframe 400-*a*.

In FIG. 4B, subframe 400-*b* (or slot, mini slot, TTI, etc.) having multiple TTIs 415 is shown. Subframe 400-*b* spans duration 405-*b*, which may be same as the duration 405-*a* in FIG. 4A. Subframe 400-*b* may be associated with a second tone spacing different from the first tone spacing in FIG. 4A. The second tone spacing may have a corresponding symbol duration, which may be smaller than the symbol duration of FIG. 4A (e.g., due to larger tone spacing).

In this example, a first multi-TTI 415-*e* and a second multi-TTI 415-*f* span the subframe duration 405-*b*. As shown, the first multi-TTI 415-*e* is preceded by two downlink control symbols 410-*e* and 410-*f*, each of which may correspond to a respective UE. For example, downlink control symbol 410-*e* may include information to be transmitted to a first UE, while downlink control symbol 410-*f* may include information to be transmitted to a second UE. In this example, the duration spanned by both downlink control symbols 410-*e* and 410-*f* (associated with a second tone spacing) may be the longer than the duration spanned by downlink control symbol 410-*a* of FIG. 4A (associated with a first tone spacing). In such cases, control transmissions or receptions may be misaligned between different tone spacings and data transmissions or receptions for at least one UE may begin sooner in FIG. 4A than data transmissions or receptions in FIG. 4B.

In addition, both downlink control symbols 410-*e* and 410-*f* may be transmitted in the first multi-TTI 415-*e* to two different UEs. For example, downlink control symbol 410-*e* may include information indicating that communication region 425-*e* is to be allocated for communication between a base station and a first UE, while control symbol 410-*f* may include information indicating that communication region 425-*f* is to be allocated for communication between a base station and a second UE.

In some examples, the order in which the control symbols are transmitted may depend on the capability of each of the first UE and the second UE. For instance, if the second UE takes longer than the first UE to process downlink control information, the control information for the second UE may be transmitted prior to the control information for the first UE. Additionally or alternatively, the second UE may be allocated communication region 425-*f* as communication region 425-*f* follows communication region 425-*e* giving the second UE more time to process the downlink control information. In other examples, power consumption of each UE may be considered when determining the order in which the transmit downlink control symbols 410-*e* and 410-*f*. For example, if a device such as an MTC device is operating with limited power (e.g., on a battery), it may use more power to search for control symbols if the control symbol corresponding to the device was transmitted at a later time. In such instances, the control symbol for the device may be transmitted near the beginning of subframe duration 405-*b*.

Nearing the end of subframe duration 405-*b*, UL control symbols 420-*b* and 420-*c* may be transmitted from different UEs to a base station. For example, UL control symbol 420-*b* may be transmitted from the first UE (allocated to communication region 425-*b*) and UL control symbol 420-*c* may be transmitted from the second UE (allocated to communication region 425-*c*). In some cases, the duration of multi-TTIs 415 within subframe 400-*b* may vary. For example, as shown in FIG. 4B, multi-TTI 415-*e* has a shorter duration than multi-TTI 415-*f*.

Figure 5:
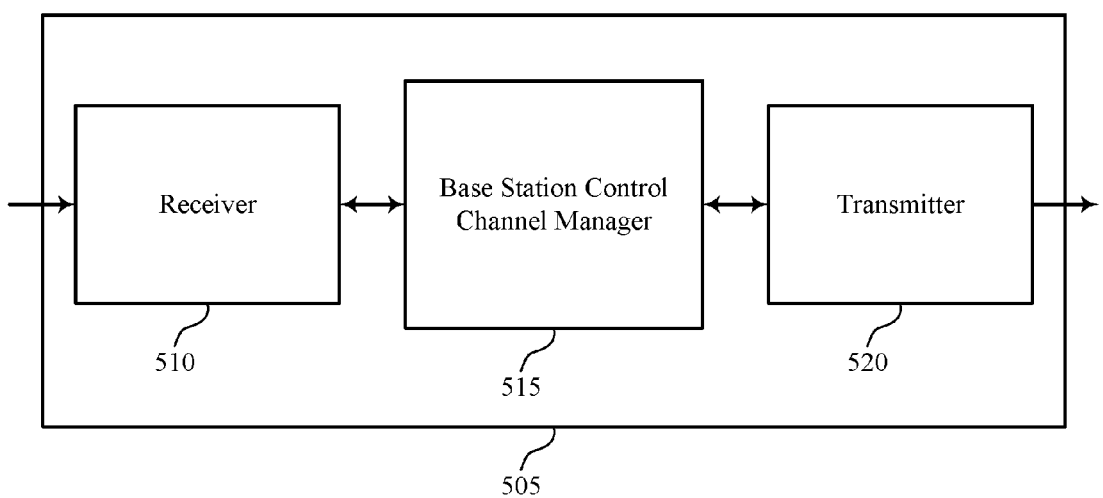
FIGS. 5 through 7 show block diagrams of a device that supports split symbol control for aligned numerology in accordance with aspects of the present disclosure.

FIG. 5 shows a block diagram 500 of a wireless device 505 that supports split symbol control for aligned numerology in accordance with various aspects of the present disclosure. Wireless device 505 may be an example of aspects of a base station 105 as described with reference to FIG. 1. Wireless device 505 may include receiver 510, base station control channel manager 515, and transmitter 520. Wireless device 505 may additionally or alternatively include a processor. Each of these components may be in communication with one another (e.g., via one or more buses).

Receiver 510 may receive information such as packets, user data, or control information associated with various information channels (e.g., control channels, data channels, and information related to split symbol control for aligned numerology, etc.). Information may be passed on to other components of the device. The receiver 510 may be an example of aspects of the transceiver 835 described with reference to FIG. 8.

Base station control channel manager 515 may be an example of aspects of the base station control channel manager 815 described with reference to FIG. 8.

Base station control channel manager 515 may identify a first number of control symbols for a subframe based on a first tone spacing, determine locations within the subframe for each of the first number of control symbols, the determined locations for each of the first number of control symbols being based on capabilities of mobile devices to which the first number of control symbols are to be transmitted, and transmit the first number of control symbols in the subframe in accordance with the determined locations. In some examples, the subframe may be referred to as a slot, a mini slot, a TTI, etc. The base station control channel manager 515 may additionally or alternatively transmit, in accordance to a first tone spacing, a first control symbol at a first control start time within a first subframe, and a first data symbol at a first data start time within the first subframe and transmit, in accordance to a second tone spacing, a second control symbol at a second control start time within a second subframe, and a second data symbol at a second data start time within the second subframe, the second control start time being the same as the first control start time and the second data start time being different from the first data start time.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
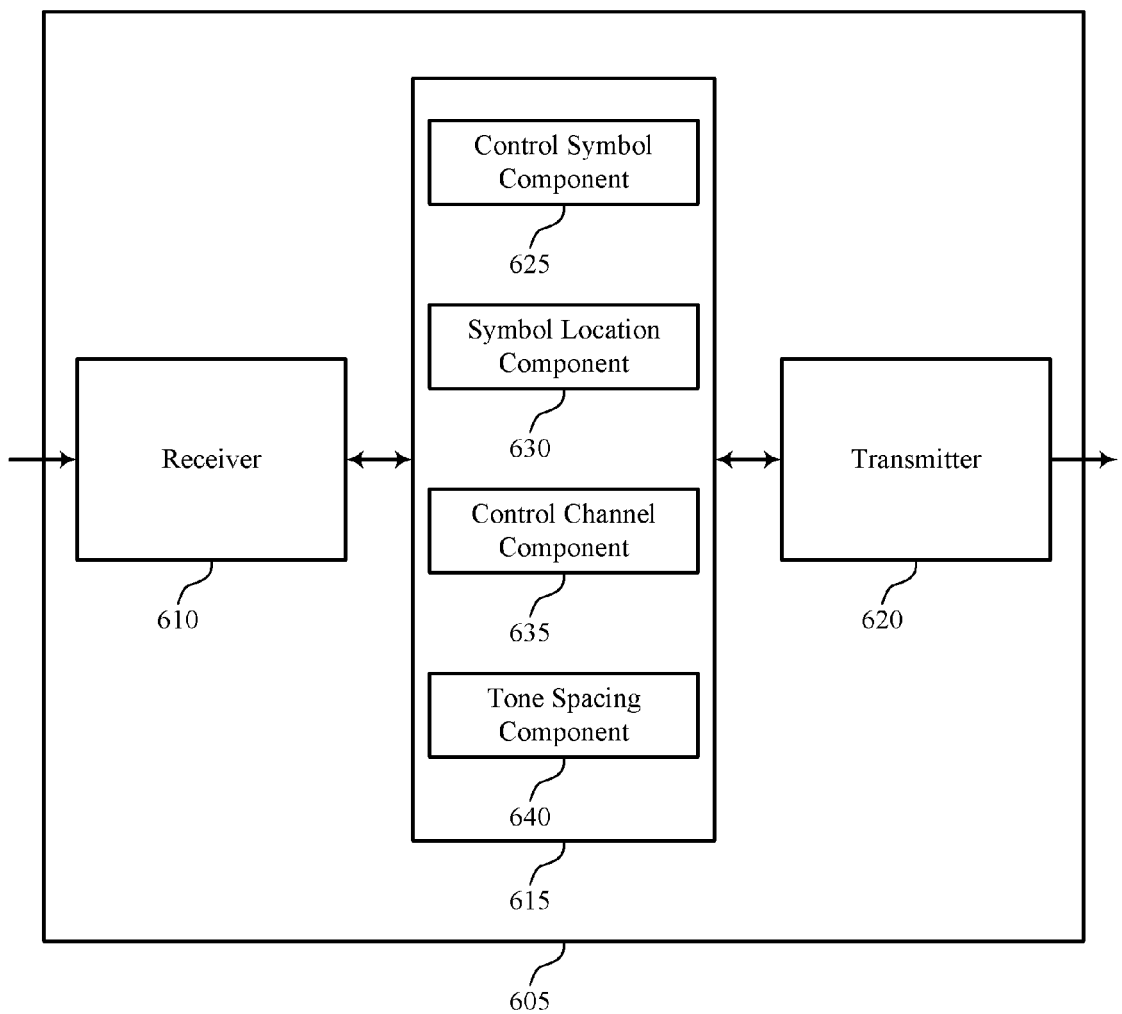

FIG. 6 shows a block diagram 600 of a wireless device 605 that supports split symbol control for aligned numerology in accordance with various aspects of the present disclosure. Wireless device 605 may be an example of aspects of a wireless device 505 or a base station 105 as described with reference to FIGS. 1 and 5. Wireless device 605 may include receiver 610, base station control channel manager 615, and transmitter 620. Wireless device 605 may additionally or alternatively include a processor. Each of these components may be in communication with one another (e.g., via one or more buses).

Receiver 610 may receive information such as packets, user data, or control information associated with various information channels (e.g., control channels, data channels, and information related to split symbol control for aligned numerology, etc.). Information may be passed on to other components of the device. The receiver 610 may be an example of aspects of the transceiver 835 described with reference to FIG. 8.

Base station control channel manager 615 may be an example of aspects of the base station control channel manager 815 described with reference to FIG. 8.

Base station control channel manager 615 may additionally or alternatively include control symbol component 625, symbol location component 630, control channel component 635, and tone spacing component 640.

Control symbol component 625 may identify a first number of control symbols for a subframe based on a first tone spacing.

Symbol location component 630 may determine locations within the subframe for each of the first number of control symbols, the determined locations for each of the first number of control symbols being based on capabilities of mobile devices to which the first number of control symbols are to be transmitted. In some cases, determining locations within the subframe for each of the first number of control symbols includes: locating a first control symbol corresponding to a first mobile device next to and in advance of additional control symbols corresponding to additional mobile devices, a duration of the first control symbol and the additional control symbols being approximately equal to a duration of a single control symbol for the first mobile device utilizing a second tone spacing.

Control channel component 635 may transmit the first number of control symbols in the subframe in accordance with the determined locations. In some cases, transmitting the first number of control symbols in the subframe includes: transmitting all of the first number of control symbols in consecutive symbols at a beginning of the subframe.

Tone spacing component 640 may transmit, in accordance to a first tone spacing, a first control symbol at a first control start time within a first subframe, and a first data symbol at a first data start time within the first subframe and transmit, in accordance to a second tone spacing, a second control symbol at a second control start time within a second subframe, and a second data symbol at a second data start time within the second subframe, the second control start time being the same as the first control start time and the second data start time being different from the first data start time. Tone spacing component 640 may additionally or alternatively transmit in accordance with the first tone spacing or transmitting in accordance with the second tone spacing is based on different environments or delay spread.

In some cases, the first tone spacing is associated with a first carrier frequency and the second tone spacing is associated with a second carrier frequency different from the first carrier frequency. In some cases, a transmission duration associated with the first control symbol is the same as a transmission duration associated with the second control symbol. In some cases, a transmission duration associated with the first control symbol is different from a transmission duration associated with the second control symbol.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
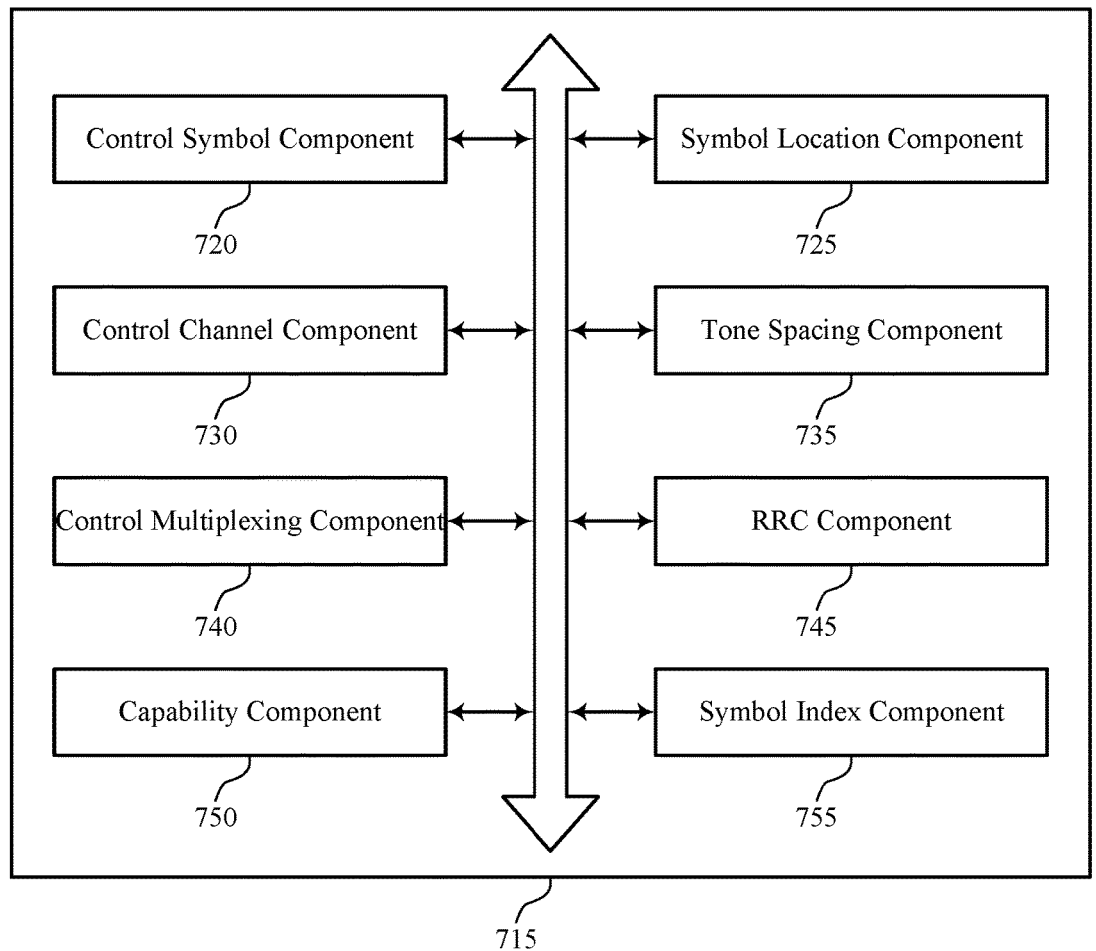

FIG. 7 shows a block diagram 700 of a base station control channel manager 715 that supports split symbol control for aligned numerology in accordance with various aspects of the present disclosure. The base station control channel manager 715 may be an example of aspects of a base station control channel manager 515, a base station control channel manager 615, or a base station control channel manager 815 described with reference to FIGS. 5, 6, and 8. The base station control channel manager 715 may include control symbol component 720, symbol location component 725, control channel component 730, tone spacing component 735, control multiplexing component 740, RRC component 745, capability component 750, and symbol index component 755. Each of these modules may communicate, directly or indirectly, with one another (e.g., via one or more buses).

Control symbol component 720 may identify a first number of control symbols for a subframe based on a first tone spacing.

Symbol location component 725 may determine locations within the subframe for each of the first number of control symbols, the determined locations for each of the first number of control symbols being based on capabilities of mobile devices to which the first number of control symbols are to be transmitted. In some cases, determining locations within the subframe for each of the first number of control symbols includes: locating a first control symbol corresponding to a first mobile device next to and in advance of additional control symbols corresponding to additional mobile devices. In some cases, a duration of the first control symbol and the additional control symbols being approximately equal to a duration of a single control symbol for the first mobile device utilizing a second tone spacing.

Control channel component 730 may transmit the first number of control symbols in the subframe in accordance with the determined locations. In some cases, transmitting the first number of control symbols in the subframe includes: transmitting all of the first number of control symbols in consecutive symbols at a beginning of the subframe.

Tone spacing component 735 may transmit, in accordance to a first tone spacing, a first control symbol at a first control start time within a first subframe, and a first data symbol at a first data start time within the first subframe and transmit, in accordance to a second tone spacing, a second control symbol at a second control start time within a second subframe, and a second data symbol at a second data start time within the second subframe, the second control start time being the same as the first control start time and the second data start time being different from the first data start time. Tone spacing component 735 may additionally or alternatively transmit in accordance with the first tone spacing or transmitting in accordance with the second tone spacing is based on different environments or delay spread. In some cases, the first tone spacing is associated with a first carrier frequency and the second tone spacing is associated with a second carrier frequency different from the first carrier frequency. In some cases, a transmission duration associated with the first control symbol is the same as a transmission duration associated with the second control symbol. In some cases, a transmission duration associated with the first control symbol is different from a transmission duration associated with the second control symbol.

Control multiplexing component 740 may transmit the first number of control symbols. In some cases, transmitting the first number of control symbols includes: transmitting the first number of control symbols to multiple mobile devices based on capabilities of the multiple mobile devices. In some cases, each control symbol of the first number of control symbols corresponds to a different mobile device. In some cases, the first number of control symbols are multiplexed according to a TDD multiplexing scheme. In some cases, transmitting the first number of control symbols in the subframe includes: transmitting the first number of control symbols to respective mobile devices prior to traffic symbols intended for the respective mobile devices.

RRC component 745 may receive a RRC message from at least one respective mobile device.

Capability component 750 may determine capabilities of the at least one respective mobile device based on the received RRC message. In some cases, the capabilities of the mobile devices includes at least one of processing time to decode a symbol associated with a PDCCH or energy consumed to search for control information at different symbols of the subframe.

Symbol index component 755 may determine a symbol index for initiating data transmission of at least one respective mobile device based on the identified first number of control symbols and transmit the determined symbol index to the at least one respective mobile device using a RRC channel.

Figure 8:
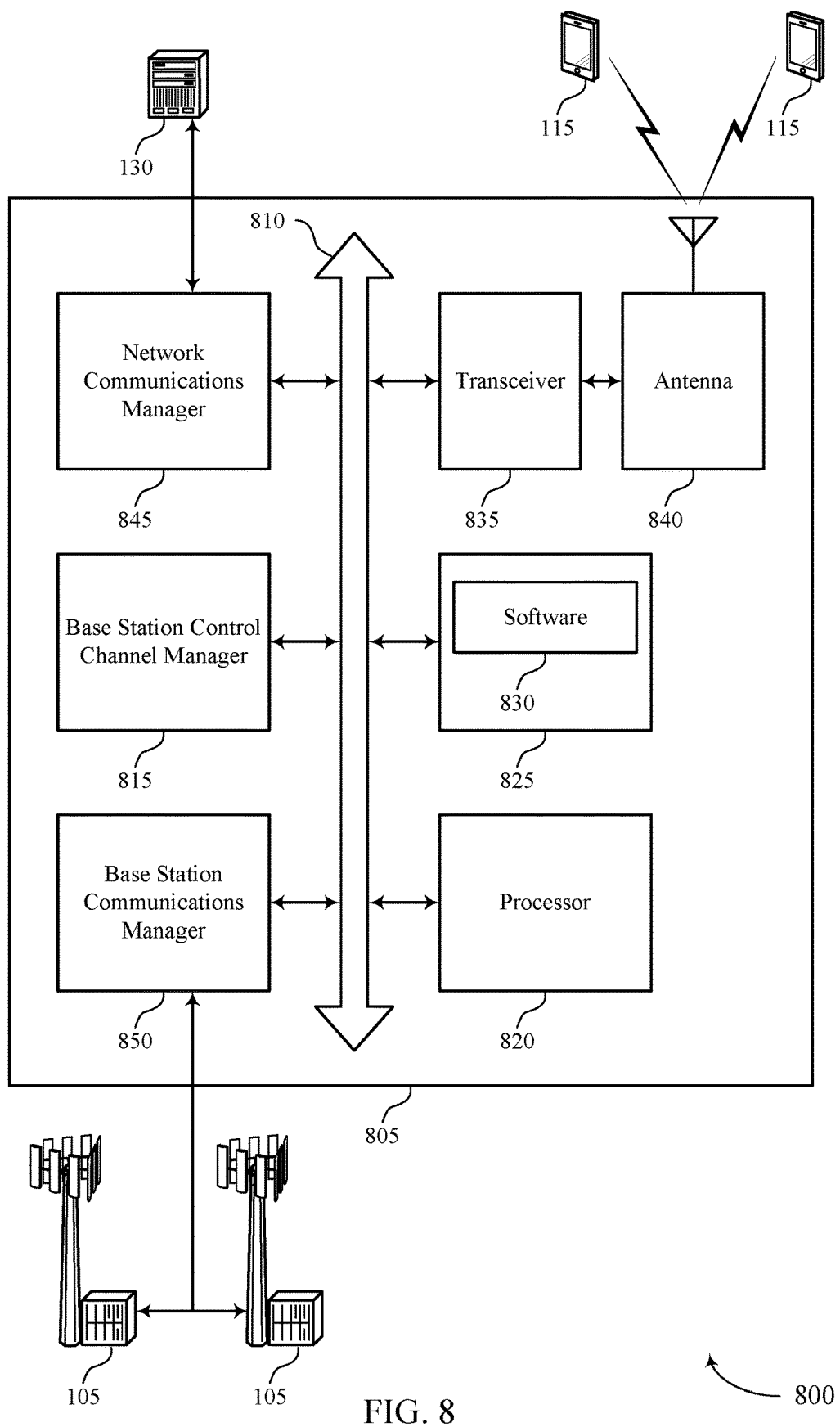
FIG. 8 illustrates a block diagram of a system including a base station that supports split symbol control for aligned numerology in accordance with aspects of the present disclosure.

FIG. 8 shows a diagram of a system 800 including a device 805 that supports split symbol control for aligned numerology in accordance with various aspects of the present disclosure. Device 805 may be an example of or include the components of wireless device 505, wireless device 605, or a base station 105 as described above, e.g., with reference to FIGS. 1, 5 and 6. Device 805 may include components for bi-directional voice and data communications including components for transmitting and receiving communications, including base station control channel manager 815, processor 820, memory 825, software 830, transceiver 835, antenna 840, network communications manager 845, and base station communications manager 850.

Processor 820 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting split symbol control for aligned numerology). 820.

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a Basic Input-Output system (BIOS) which may control basic hardware and/or software operation such as the interaction with peripheral components or devices.

Software 830 may include code to implement aspects of the present disclosure, including code to support split symbol control for aligned numerology. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may additionally or alternatively include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications module 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an LTE/LTE-A wireless communication network technology to provide communication between base stations 105.

Figure 9:
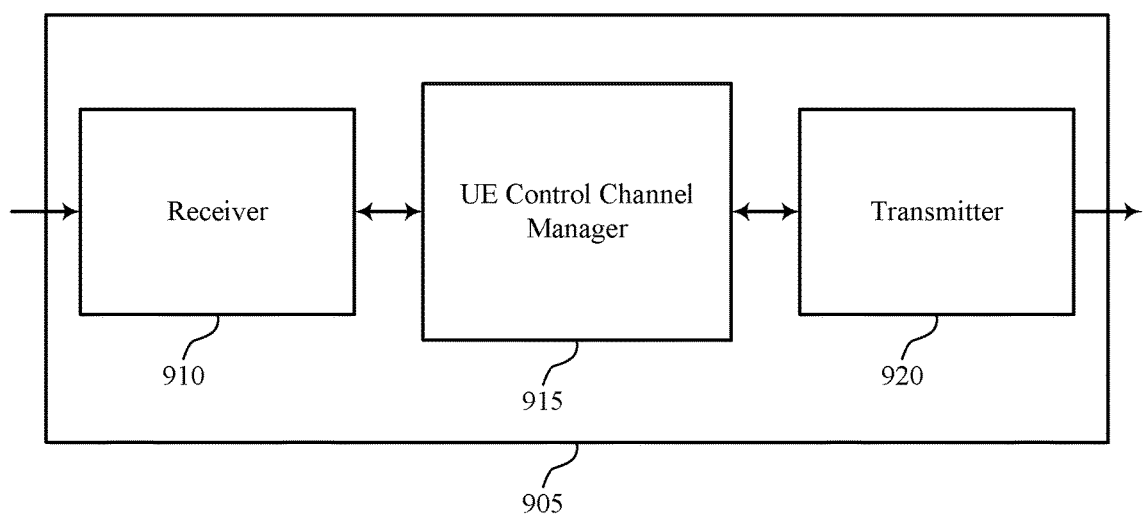
FIGS. 9 through 11 show block diagrams of a device that supports split symbol control for aligned numerology in accordance with aspects of the present disclosure.

FIG. 9 shows a block diagram 900 of a wireless device 905 that supports split symbol control for aligned numerology in accordance with various aspects of the present disclosure. Wireless device 905 may be an example of aspects of a UE 115 as described with reference to FIG. 1. Wireless device 905 may include receiver 910, UE control channel manager 915, and transmitter 920. Wireless device 905 may additionally or alternatively include a processor. Each of these components may be in communication with one another (e.g., via one or more buses).

Receiver 910 may receive information such as packets, user data, or control information associated with various information channels (e.g., control channels, data channels, and information related to split symbol control for aligned numerology, etc.). Information may be passed on to other components of the device. The receiver 910 may be an example of aspects of the transceiver 1235 described with reference to FIG. 12.

UE control channel manager 915 may be an example of aspects of the UE control channel manager 1215 described with reference to FIG. 12.

UE control channel manager 915 may receive, in accordance to a first tone spacing, a first control symbol at a first control start time within a first subframe, and a first data symbol at a first data start time within the first subframe and transmit, in accordance to a second tone spacing, a second control symbol at a second control start time within a second subframe, and a second data symbol at a second data start time within the second subframe, the second control start time being the same as the first control start time and the second data start time being different from the first data start time.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
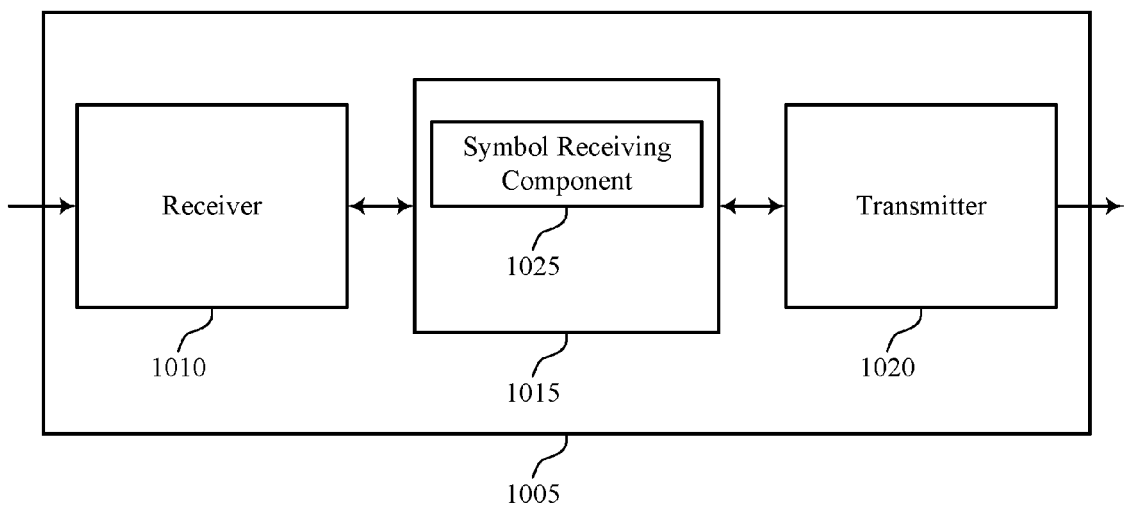

FIG. 10 shows a block diagram 1000 of a wireless device 1005 that supports split symbol control for aligned numerology in accordance with various aspects of the present disclosure. Wireless device 1005 may be an example of aspects of a wireless device 905 or a UE 115 as described with reference to FIGS. 1 and 9. Wireless device 1005 may include receiver 1010, UE control channel manager 1015, and transmitter 1020. Wireless device 1005 may additionally or alternatively include a processor. Each of these components may be in communication with one another (e.g., via one or more buses).

Receiver 1010 may receive information such as packets, user data, or control information associated with various information channels (e.g., control channels, data channels, and information related to split symbol control for aligned numerology, etc.). Information may be passed on to other components of the device. The receiver 1010 may be an example of aspects of the transceiver 1235 described with reference to FIG. 12.

UE control channel manager 1015 may be an example of aspects of the UE control channel manager 1215 described with reference to FIG. 12. UE control channel manager 1015 may additionally or alternatively include symbol receiving component 1025.

Symbol receiving component 1025 may receive, in accordance to a first tone spacing, a first control symbol at a first control start time within a first subframe, and a first data symbol at a first data start time within the first subframe and transmit, in accordance to a second tone spacing, a second control symbol at a second control start time within a second subframe, and a second data symbol at a second data start time within the second subframe, the second control start time being the same as the first control start time and the second data start time being different from the first data start time.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
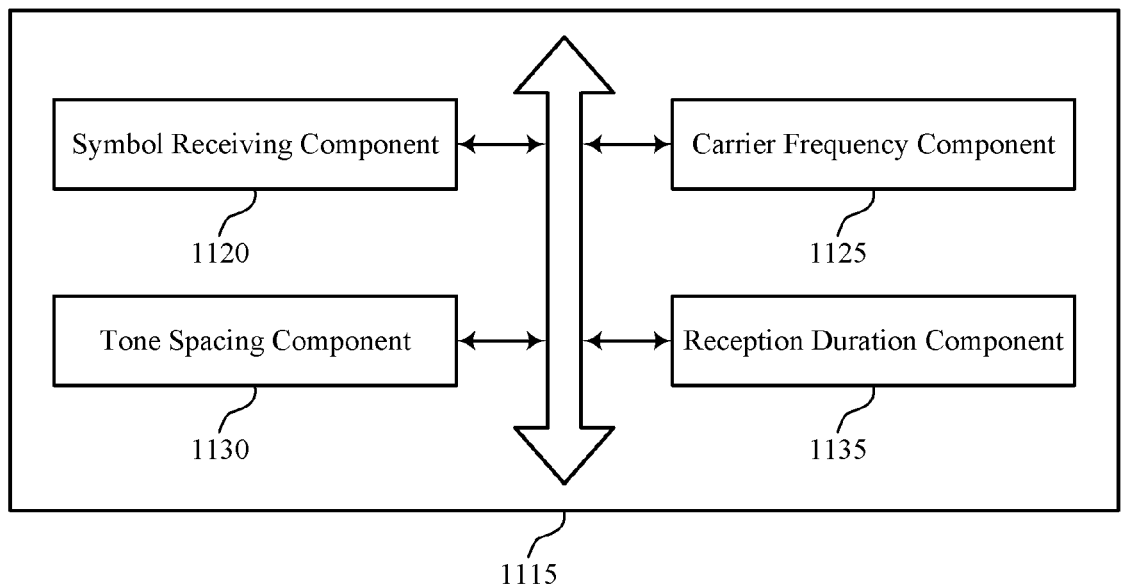

FIG. 11 shows a block diagram 1100 of a UE control channel manager 1115 that supports split symbol control for aligned numerology in accordance with various aspects of the present disclosure. The UE control channel manager 1115 may be an example of aspects of a UE control channel manager 1215 described with reference to FIGS. 9, 10, and 12. The UE control channel manager 1115 may include symbol receiving component 1120, carrier frequency component 1125, tone spacing component 1130, and reception duration component 1135. Each of these modules may communicate, directly or indirectly, with one another (e.g., via one or more buses).

Symbol receiving component 1120 may receive, in accordance to a first tone spacing, a first control symbol at a first control start time within a first subframe, and a first data symbol at a first data start time within the first subframe and transmit, in accordance to a second tone spacing, a second control symbol at a second control start time within a second subframe, and a second data symbol at a second data start time within the second subframe, the second control start time being the same as the first control start time and the second data start time being different from the first data start time.

Carrier frequency component 1125 may determine carrier frequencies. In some cases, the first tone spacing is associated with a first carrier frequency and the second tone spacing is associated with a second carrier frequency different from the first carrier frequency.

Tone spacing component 1130 may receive in accordance with the first tone spacing or receiving in accordance with the second tone spacing is based on different environments or delay spread.

Reception duration component 1135 may determine reception durations. In some cases, a reception duration associated with the first control symbol is the same as a reception duration associated with the second control symbol. In some cases, a reception duration associated with the first control symbol is different from a reception duration associated with the second control symbol.

Figure 12:
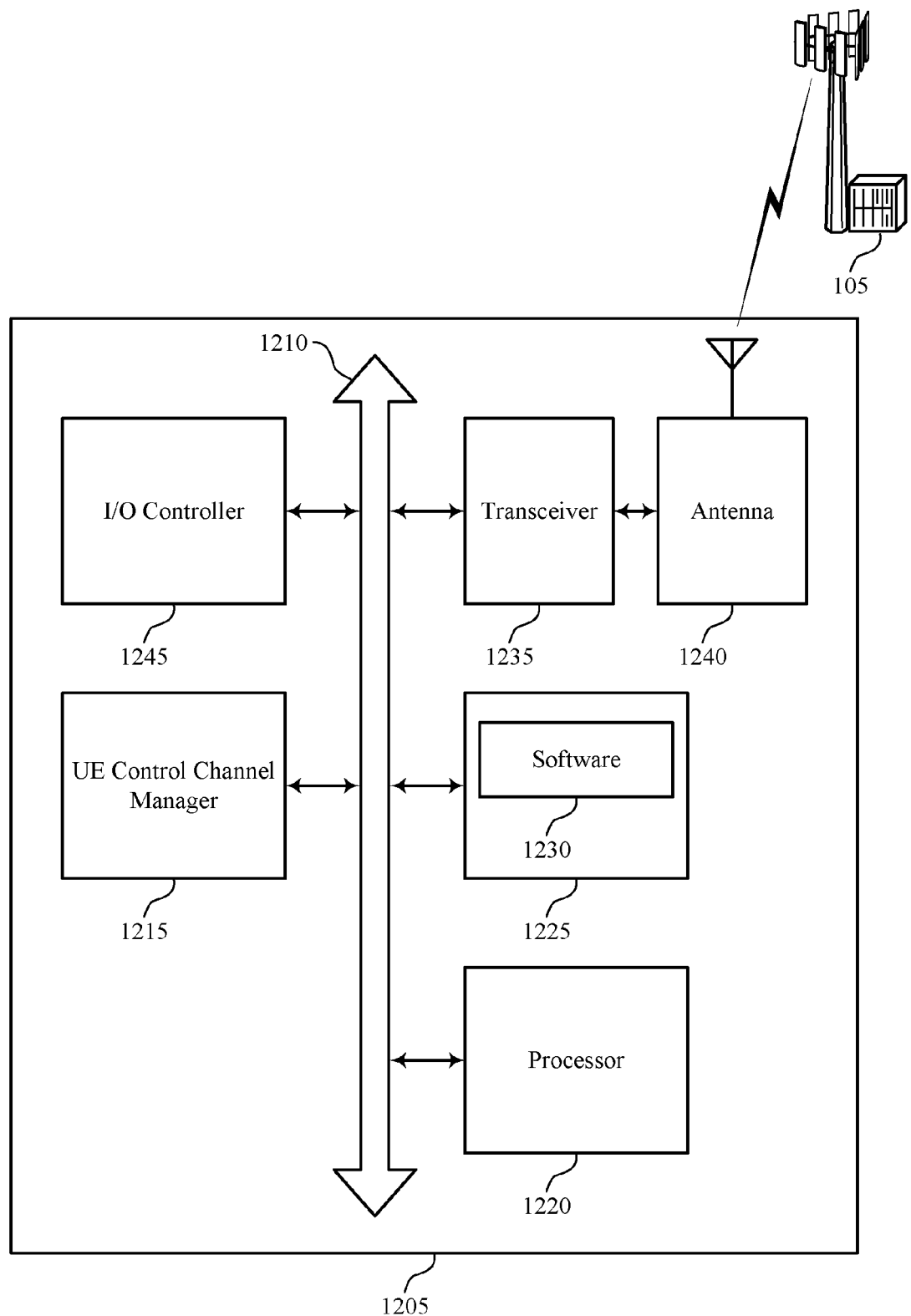
FIG. 12 illustrates a block diagram of a system including a user equipment (UE) that supports split symbol control for aligned numerology in accordance with aspects of the present disclosure.

FIG. 12 shows a diagram of a system 1200 including a device 1205 that supports split symbol control for aligned numerology in accordance with various aspects of the present disclosure. Device 1205 may be an example of or include the components of UE 115 as described above, e.g., with reference to FIG. 1. Device 1205 may include components for bi-directional voice and data communications including components for transmitting and receiving communications, including UE control channel manager 1215, processor 1220, memory 1225, software 1230, transceiver 1235, antenna 1240, and I/O controller 1245.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting split symbol control for aligned numerology).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support split symbol control for aligned numerology. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may additionally or alternatively include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. Input/output control component 1245 may additionally or alternatively manage peripherals not integrated into device 1205. In some cases, input/output control component 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
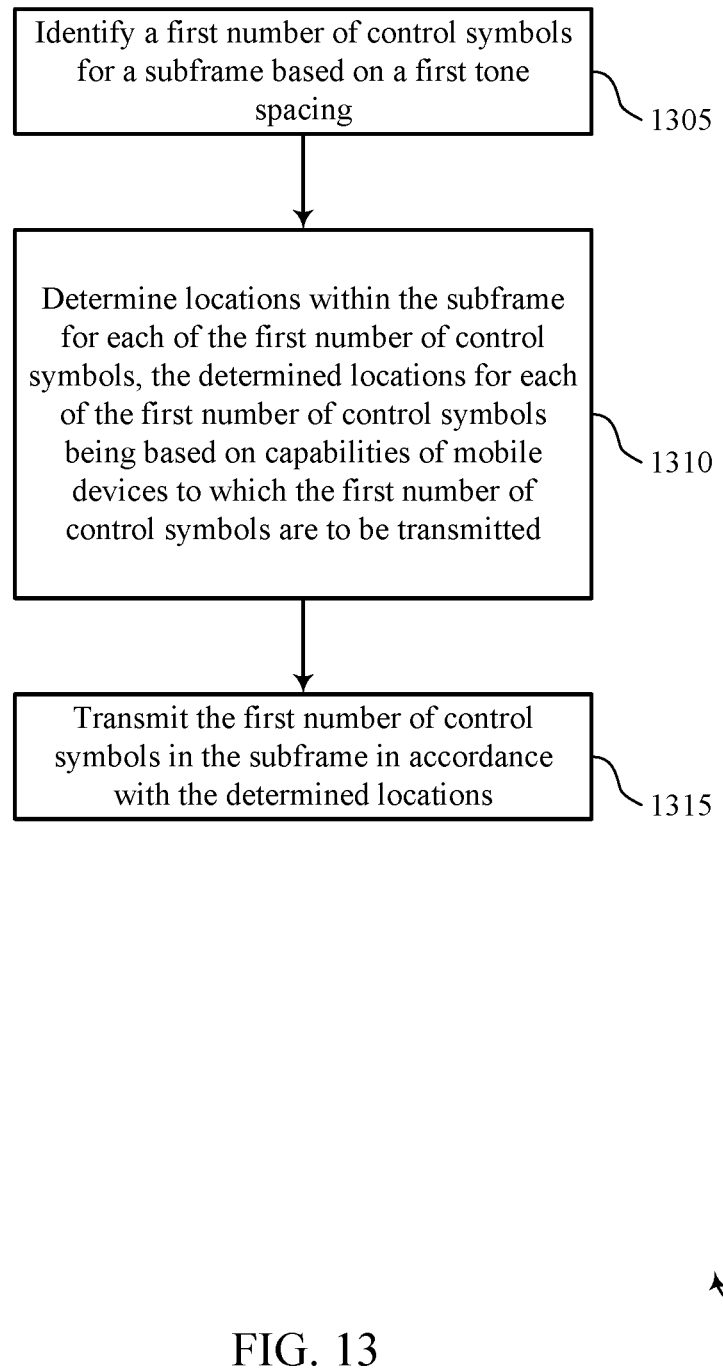
FIGS. 13 through 15 illustrate methods for split symbol control for aligned numerology in accordance with aspects of the present disclosure.

FIG. 13 shows a flowchart illustrating a method 1300 for split symbol control for aligned numerology in accordance with various aspects of the present disclosure. The operations of method 1300 may be implemented by a base station 105 or its components as described herein. For example, the operations of method 1300 may be performed by a base station control channel manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1305 the base station 105 may identify a first number of control symbols for a subframe based on a first tone spacing. The operations of block 1305 may be performed according to the methods described with reference to FIGS. 1 through 4. In some examples, aspects of the operations of block 1305 may be performed by a control symbol component as described with reference to FIGS. 5 through 8.

At block 1310 the base station 105 may determine locations within the subframe for each of the first number of control symbols, the determined locations for each of the first number of control symbols being based on capabilities of mobile devices to which the first number of control symbols are to be transmitted. The operations of block 1310 may be performed according to the methods described with reference to FIGS. 1 through 4. In some examples, aspects of the operations of block 1310 may be performed by a symbol location component as described with reference to FIGS. 5 through 8.

At block 1315 the base station 105 may transmit the first number of control symbols in the subframe in accordance with the determined locations. The operations of block 1315 may be performed according to the methods described with reference to FIGS. 1 through 4. In some examples, aspects of the operations of block 1315 may be performed by a control channel component as described with reference to FIGS. 5 through 8.

Figure 14:
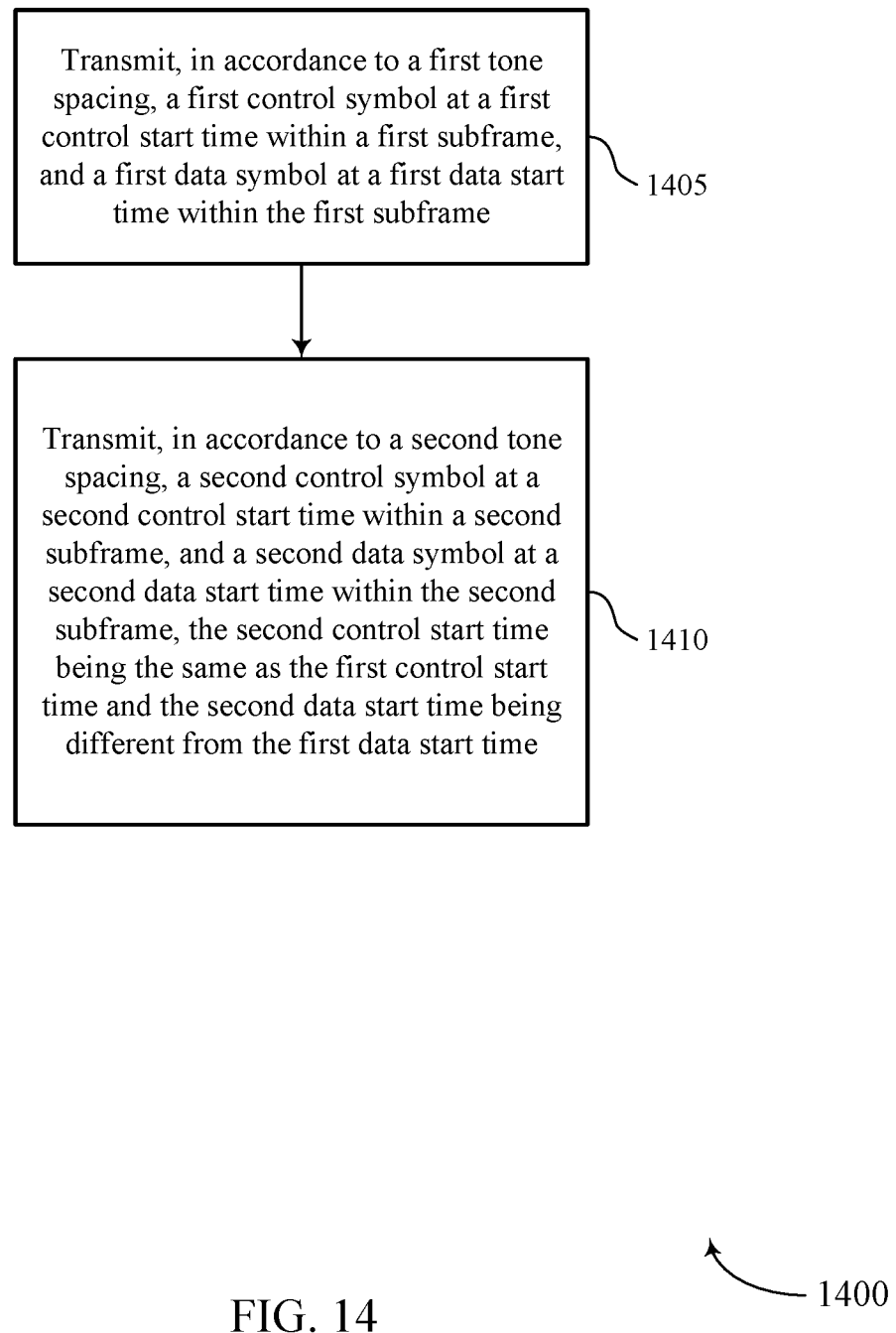

FIG. 14 shows a flowchart illustrating a method 1400 for split symbol control for aligned numerology in accordance with various aspects of the present disclosure. The operations of method 1400 may be implemented by a base station 105 or its components as described herein. For example, the operations of method 1400 may be performed by a base station control channel manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1405 the base station 105 may transmit, in accordance to a first tone spacing, a first control symbol at a first control start time within a first subframe, and a first data symbol at a first data start time within the first subframe. The operations of block 1405 may be performed according to the methods described with reference to FIGS. 1 through 4. In some examples, aspects of the operations of block 1405 may be performed by a tone spacing component as described with reference to FIGS. 5 through 8.

At block 1410 the base station 105 may transmit, in accordance to a second tone spacing, a second control symbol at a second control start time within a second subframe, and a second data symbol at a second data start time within the second subframe, the second control start time being the same as the first control start time and the second data start time being different from the first data start time. The operations of block 1410 may be performed according to the methods described with reference to FIGS. 1 through 4. In some examples, aspects of the operations of block 1410 may be performed by a tone spacing component as described with reference to FIGS. 5 through 8.

Figure 15:
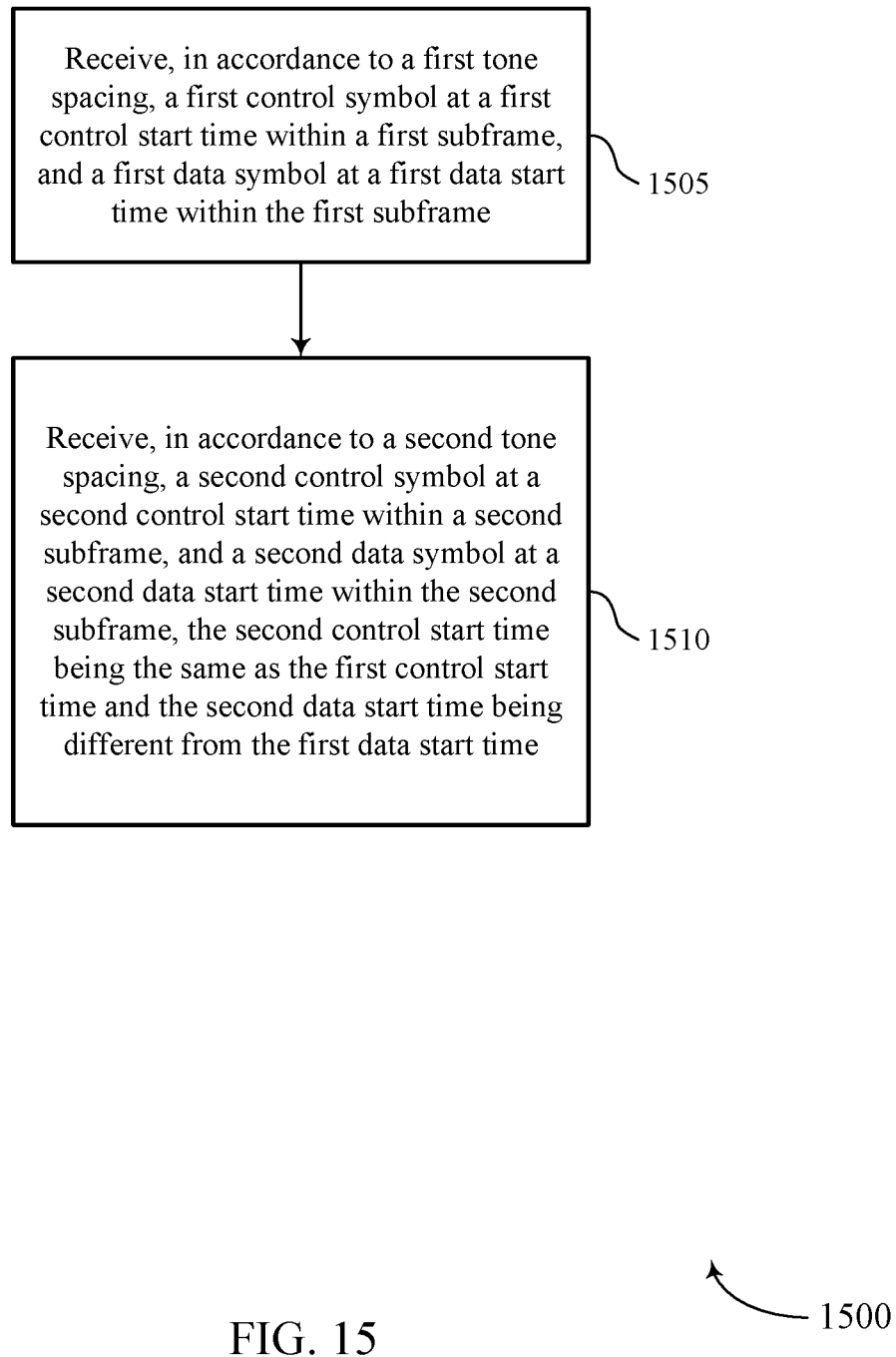

FIG. 15 shows a flowchart illustrating a method 1500 for split symbol control for aligned numerology in accordance with various aspects of the present disclosure. The operations of method 1500 may be implemented by a UE 115 or its components as described herein. For example, the operations of method 1500 may be performed by a UE control channel manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1505 the UE 115 may receive, in accordance to a first tone spacing, a first control symbol at a first control start time within a first subframe, and a first data symbol at a first data start time within the first subframe. The operations of block 1505 may be performed according to the methods described with reference to FIGS. 1 through 4. In some examples, aspects of the operations of block 1505 may be performed by a symbol receiving component as described with reference to FIGS. 9 through 12.

At block 1510 the UE 115 may receive, in accordance to a second tone spacing, a second control symbol at a second control start time within a second subframe, and a second data symbol at a second data start time within the second subframe, the second control start time being the same as the first control start time and the second data start time being different from the first data start time. The operations of block 1510 may be performed according to the methods described with reference to FIGS. 1 through 4. In some examples, aspects of the operations of block 1510 may be performed by a symbol receiving component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell, for example, covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may additionally or alternatively be called forward link transmissions while the uplink transmissions may additionally or alternatively be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may additionally or alternatively be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are additionally or alternatively included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a first number of control symbols for a subframe based at least in part on a first tone spacing;
    determining locations within the subframe for each of the first number of control symbols; and
    transmitting the first number of control symbols in the subframe in accordance with the determined locations.

2. The method of claim 1, wherein the determined locations for each of the first number of control symbols are based at least in part on capabilities of mobile devices to which the first number of control symbols are to be transmitted.

3. The method of claim 1, wherein transmitting the first number of control symbols comprises:
    transmitting the first number of control symbols to multiple mobile devices based at least in part on capabilities of the multiple mobile devices.

4. The method of claim 3, wherein each control symbol of the first number of control symbols corresponds to a different mobile device.

5. The method of claim 3, wherein the first number of control symbols are multiplexed according to a time division multiplexing (TDM) scheme.

6. The method of claim 3, wherein transmitting the first number of control symbols in the subframe comprises:
transmitting the first number of control symbols to the plurality of mobile devices prior to traffic symbols intended for the respective mobile devices.

7. The method of claim 1, wherein determining locations within the subframe for each of the first number of control symbols comprises:
locating a first control symbol corresponding to a first mobile device next to and in advance of additional control symbols corresponding to additional mobile devices, a duration of the first control symbol and the additional control symbols being approximately equal to a duration of a single control symbol for the first mobile device utilizing a second tone spacing.

8. The method of claim 1, wherein transmitting the first number of control symbols in the subframe comprises:
transmitting all of the first number of control symbols in consecutive symbols at a beginning of the subframe.

9. The method of claim 1, further comprising:
receiving a radio resource control (RRC) message from at least one respective mobile device; and
determining capabilities of the at least one respective mobile device based at least in part on the received RRC message.

10. The method of claim 1, further comprising:
determining a symbol index for initiating data transmission of at least one respective mobile device based at least in part on the identified first number of control symbols.

11. The method of claim 10, further comprising:
transmitting the determined symbol index to the at least one respective mobile device using a radio resource control (RRC) channel.

12. The method of claim 2, wherein capabilities of the mobile devices comprise at least one of processing time to decode a symbol associated with a physical downlink control channel (PDCCH) or energy consumed to search for control information at different symbols of the subframe.

13. A method for wireless communication, comprising:
transmitting, in accordance to a first tone spacing, a first control symbol at a first control start time within a first subframe, and a first data symbol at a first data start time within the first subframe; and
transmitting, in accordance to a second tone spacing, a second control symbol at a second control start time within a second subframe, and a second data symbol at a second data start time within the second subframe, the second control start time being the same as the first control start time and the second data start time being different from the first data start time.

14. The method of claim 13, wherein the first tone spacing is associated with a first carrier frequency and the second tone spacing is associated with a second carrier frequency different from the first carrier frequency.

15. The method of claim 13, further comprising:
transmitting in accordance with the first tone spacing or transmitting in accordance with the second tone spacing is based at least in part on different environments or delay spread.

16. The method of claim 13, wherein a transmission duration associated with the first control symbol is the same as a transmission duration associated with the second control symbol.

17. The method of claim 13, wherein a transmission duration associated with the first control symbol is different from a transmission duration associated with the second control symbol.

18. A method for wireless communication, comprising:
receiving, in accordance to a first tone spacing, a first control symbol at a first control start time within a first subframe, and a first data symbol at a first data start time within the first subframe; and
receiving, in accordance to a second tone spacing, a second control symbol at a second control start time within a second subframe, and a second data symbol at a second data start time within the second subframe, the second control start time being the same as the first control start time and the second data start time being different from the first data start time.

19. The method of claim 18, wherein the first tone spacing is associated with a first carrier frequency and the second tone spacing is associated with a second carrier frequency different from the first carrier frequency.

20. The method of claim 18, further comprising:
receiving in accordance with the first tone spacing or receiving in accordance with the second tone spacing is based at least in part on different environments or delay spread.

21. The method of claim 18, wherein a reception duration associated with the first control symbol is the same as a reception duration associated with the second control symbol.

22. The method of claim 18, wherein a reception duration associated with the first control symbol is different from a reception duration associated with the second control symbol.

23. An apparatus for wireless communication, in a system comprising:
a processor;
memory in electronic communication with the processor; and
instructions stored in the memory and operable, when executed by the processor, to cause the apparatus to:
identify a first number of control symbols for a subframe based at least in part on a first tone spacing;
determine locations within the subframe for each of the first number of control symbols; and
transmit the first number of control symbols in the subframe in accordance with the determined locations.

24. The apparatus of claim 23, wherein the determined locations for each of the first number of control symbols are based at least in part on capabilities of mobile devices to which the first number of control symbols are to be transmitted.

25. The apparatus of claim 23, wherein the instructions are further executable by the processor to:
transmit the first number of control symbols to multiple mobile devices based at least in part on capabilities of the multiple mobile devices.

26. The apparatus of claim 25, wherein each control symbol of the first number of control symbols corresponds to a different mobile device.

27. The apparatus of claim 25, wherein the first number of control symbols are multiplexed according to a time division multiplexing (TDM) scheme.

28. The apparatus of claim 25, wherein the instructions are further executable by the processor to:

transmit the first number of control symbols to respective mobile devices prior to traffic symbols intended for the respective mobile devices.

29. The apparatus of claim 24, wherein the instructions are further executable by the processor to:

locate a first control symbol corresponding to a first mobile device next to and in advance of additional control symbols corresponding to additional mobile devices, a duration of the first control symbol and the additional control symbols being approximately equal to a duration of a single control symbol for the first mobile device utilizing a second tone spacing.

30. The apparatus of claim 23, wherein the instructions are further executable by the processor to:

transmit all of the first number of control symbols in consecutive symbols at a beginning of the subframe.

* * * * *